United States Patent
Islam et al.

(10) Patent No.: US 10,986,694 B2
(45) Date of Patent: Apr. 20, 2021

(54) TECHNIQUES TO ORDER DIRECTION SIGNALS DURING DISCONTINUOUS RECEPTION

(71) Applicant: QUALCOMM Incorporated, San Diego, CA (US)

(72) Inventors: Muhammad Nazmul Islam, Littleton, MA (US); Tao Luo, San Diego, CA (US); Wooseok Nam, San Diego, CA (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 16/382,992

(22) Filed: Apr. 12, 2019

(65) Prior Publication Data

US 2020/0008260 A1     Jan. 2, 2020

Related U.S. Application Data

(60) Provisional application No. 62/693,214, filed on Jul. 2, 2018.

(51) Int. Cl.
*H04W 76/28* (2018.01)
*H04B 7/06* (2006.01)
(Continued)

(52) U.S. Cl.
CPC .......... *H04W 76/28* (2018.02); *H04B 7/0632* (2013.01); *H04B 17/309* (2015.01); *H04W 16/28* (2013.01)

(58) Field of Classification Search
CPC ..... H04B 7/0408; H04B 7/088; H04B 17/318
See application file for complete search history.

(56) References Cited

U.S. PATENT DOCUMENTS

| 2011/0064033 A1* | 3/2011 | Gong | H04B 7/0617 370/329 |
|---|---|---|---|
| 2014/0198696 A1* | 7/2014 | Li | H04W 52/0229 370/311 |

(Continued)

FOREIGN PATENT DOCUMENTS

WO     WO-2017196219 A1     11/2017

OTHER PUBLICATIONS

International Search Report and Written Opinion—PCT/US2019/034931—ISA/EPO—dated Aug. 9, 2019.

(Continued)

*Primary Examiner* — Melanie Jagannathan
(74) *Attorney, Agent, or Firm* — Linda G. Gunderson

(57) ABSTRACT

Techniques are described herein for reordering beams used to transmit reference signals for subsequent beam sweeps of a beam management procedure. Beams used to transmit reference signals may be hierarchically ordered to enable a user equipment (UE) to terminate the beam management procedure early and thereby conserve power while operating in a discontinuous reception mode. A base station may transmit reference signals using a first ordered set of beams as part of a first beam sweep. The UE may transmit feedback information to the base station about the signal quality for at least some of the reference signals. The base station may generate a second ordered set of beams based on the feedback information. The base station may transmit the reference signals using the second ordered set of beams as part of a second beam sweep.

30 Claims, 17 Drawing Sheets

(51) Int. Cl.
*H04B 17/309* (2015.01)
*H04W 16/28* (2009.01)

(56) References Cited

U.S. PATENT DOCUMENTS

| | | | | |
|---|---|---|---|---|
| 2016/0192433 | A1* | 6/2016 | Deenoo | H04W 72/046 |
| | | | | 370/329 |
| 2016/0248451 | A1* | 8/2016 | Weissman | H04B 1/40 |
| 2017/0251518 | A1* | 8/2017 | Agiwal | H04W 76/28 |
| 2018/0097556 | A1* | 4/2018 | Nagaraja | H04B 7/0617 |
| 2018/0279134 | A1* | 9/2018 | Malik | H04W 16/28 |
| 2019/0037426 | A1* | 1/2019 | Yu | H04W 16/28 |
| 2019/0053321 | A1* | 2/2019 | Islam | H04W 72/046 |
| 2019/0074890 | A1* | 3/2019 | Chang | H04B 7/0695 |
| 2019/0150013 | A1* | 5/2019 | Zhang | H04W 24/08 |
| | | | | 375/224 |
| 2019/0166556 | A1* | 5/2019 | Ly | H04W 52/0229 |
| 2019/0182767 | A1* | 6/2019 | Deng | H04B 7/0617 |
| 2019/0191397 | A1* | 6/2019 | Pan | H04B 7/0695 |
| 2019/0238201 | A1* | 8/2019 | Nilsson | H04B 7/0617 |
| 2019/0238270 | A1* | 8/2019 | Pan | H04B 7/0695 |
| 2019/0254110 | A1* | 8/2019 | He | H04L 5/005 |
| 2019/0319686 | A1* | 10/2019 | Chen, IV | H04W 72/046 |
| 2020/0007211 | A1* | 1/2020 | Liu | H04B 7/0491 |
| 2020/0015313 | A1* | 1/2020 | Reial | H04L 5/0007 |
| 2020/0028544 | A1* | 1/2020 | Bengtsson | H04B 7/0408 |
| 2020/0044702 | A1* | 2/2020 | Kakishima | H04B 7/0617 |
| 2020/0128436 | A1* | 4/2020 | Chae | H04B 7/0404 |
| 2020/0195333 | A1* | 6/2020 | Li | H04B 7/06 |
| 2020/0196161 | A1* | 6/2020 | Ahn | H04B 17/318 |

OTHER PUBLICATIONS

Samsung: "NR paging channel design", 3GPP Draft; R1-1612458 Paging, 3RD Generation Partnership Project (3GPP), Mobile Competence Centre ; 650, Route Des Lucioles ; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176406, 4 Pages, Retrieved from the Internet: URL:http://www.3gpp.org/ftp/Meetings_3GPP_SYNC/RAN1/Docs/ [retrieved on Nov. 13, 2016], paragraph [2.2PaginginNR].

* cited by examiner ns During Discontinuous Reception," filed Jul. 2, 2018, assigned to the assignee hereof, and expressly incorporated herein.

BACKGROUND

TECHNIQUES TO ORDER DIRECTION SIGNALS DURING DISCONTINUOUS RECEPTION

CROSS REFERENCE

The present Application for patent claims the benefit of U.S. Provisional Patent Application No. 62/693,214 by Islam, et al., entitled "Techniques To Order Direction Sig- The following relates generally to wireless communications, and more specifically to techniques to order direction signals during discontinuous reception.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may enter a discontinuous reception (DRX) mode to conserve power. Beam management procedures may be executed while the UE is operating in the DRX mode to maintain a communication link.

SUMMARY

The described techniques relate to improved methods, systems, devices, and apparatuses that support techniques to order direction signals during discontinuous reception. Generally, the described techniques provide for reordering beams used to transmit reference signals for subsequent beam sweeps of a beam management procedure. Beams used to transmit reference signals may be hierarchically ordered to enable a user equipment (UE) to terminate the beam management procedure early and thereby conserve power while operating in a discontinuous reception mode. A base station may transmit reference signals using a first ordered set of beams as part of a first beam sweep. The UE may transmit feedback information to the base station about the signal quality for at least some of the reference signals. The base station may generate a second ordered set of beams based on the feedback information. The base station may transmit the reference signals using the second ordered set of beams as part of a second beam sweep. If the UE determines that a reference signal satisfies a threshold, the UE may terminate the beam management procedure early.

A method of wireless communication is described. The method may include transmitting a set of reference signals using a first ordered set of beams, receiving feedback information from a UE operating in a discontinuous reception (DRX) mode, the feedback information based on the set of reference signals, generating a second ordered set of beams for the set of reference signals that is different from the first ordered set of beams, the second ordered set of beams based on receiving the feedback information from the UE, and transmitting the set of reference signals using the second ordered set of beams.

An apparatus for wireless communication is described. The apparatus may include a processor, memory in electronic communication with the processor, and instructions stored in the memory. The instructions may be executable by the processor to cause the apparatus to transmit a set of reference signals using a first ordered set of beams, receive feedback information from a UE operating in a DRX mode, the feedback information based on the set of reference signals, generate a second ordered set of beams for the set of reference signals that is different from the first ordered set of beams, the second ordered set of beams based on receiving the feedback information from the UE, and transmit the set of reference signals using the second ordered set of beams.

Another apparatus for wireless communication is described. The apparatus may include means for transmitting a set of reference signals using a first ordered set of beams, receiving feedback information from a UE operating in a DRX mode, the feedback information based on the set of reference signals, generating a second ordered set of beams for the set of reference signals that is different from the first ordered set of beams, the second ordered set of beams based on receiving the feedback information from the UE, and transmitting the set of reference signals using the second ordered set of beams.

A non-transitory computer-readable medium storing code for wireless communication is described. The code may include instructions executable by a processor to transmit a set of reference signals using a first ordered set of beams, receive feedback information from a UE operating in a DRX mode, the feedback information based on the set of reference signals, generate a second ordered set of beams for the set of reference signals that is different from the first ordered set of beams, the second ordered set of beams based on receiving the feedback information from the UE, and transmit the set of reference signals using the second ordered set of beams.

Some examples of the method, apparatuses, and non-transitory computer-readable medium described herein may further include operations, features, means, or instructions for identifying a first beam of the first ordered set of beams to be used to communicate a wake-up signal to the UE based on the feedback information.

Some examples of the method, apparatuses, and non-transitory computer-readable medium described herein may further include operations, features, means, or instructions for reordering the first ordered set of beams to prioritize the first beam based on identifying the first beam, where generating the second ordered set of beams may be based on reordering the first ordered set of beams.

Some examples of the method, apparatuses, and non-transitory computer-readable medium described herein may further include operations, features, means, or instructions for identifying a second beam of the first ordered set of beams to be used to communicate the wake-up signal based on the feedback information and reordering the first ordered set of beams to prioritize the first beam and the second beam based on identifying the first beam, where generating the second ordered set of beams may be based on reordering the first ordered set of beams.

In some examples of the method, apparatuses, and non-transitory computer-readable medium described herein, the first beam may be positioned before the second beam in the second ordered set of beams.

In some examples of the method, apparatuses, and non-transitory computer-readable medium described herein, the first beam may be adjacent to the second beam in the second ordered set of beams.

Some examples of the method, apparatuses, and non-transitory computer-readable medium described herein may further include operations, features, means, or instructions for transmitting the wake-up signal using the first beam and the second beam during an on-period of the DRX mode of the UE.

Some examples of the method, apparatuses, and non-transitory computer-readable medium described herein may further include operations, features, means, or instructions for ranking the beams of the first ordered set of beams based on a signal quality for each signal associated with the beams based on the feedback information, where generating the second ordered set of beams may be based on ranking the beams.

Some examples of the method, apparatuses, and non-transitory computer-readable medium described herein may further include operations, features, means, or instructions for identifying that the feedback information fails to indicate a preference between at least some beams included in the feedback information and ordering the beams for the second ordered set of beams based on which beams may be adjacent to each other.

Some examples of the method, apparatuses, and non-transitory computer-readable medium described herein may further include operations, features, means, or instructions for identifying an indication of signal quality based on receiving the feedback information, where generating the second ordered set of beams may be based on identifying the indication of signal quality.

In some examples of the method, apparatuses, and non-transitory computer-readable medium described herein, the feedback information includes received signal received power (RSRP), received signal received quality (RSRQ), a signal-to-noise ratio (SNR), a signal-to-interference-plus-noise ratio (SNIR), or a combination thereof.

Some examples of the method, apparatuses, and non-transitory computer-readable medium described herein may further include operations, features, means, or instructions for identifying a beam index of a beam of the first ordered set of beams selected by the UE to be used to communicate a wake-up signal based on the feedback information, where generating the second ordered set of beams may be based on identifying the beam index selected by the UE.

Some examples of the method, apparatuses, and non-transitory computer-readable medium described herein may further include operations, features, means, or instructions for identifying an angle of departure for the beams of the first ordered set of beams based on the feedback information, where generating the second ordered set of beams may be based on identifying the angle of departure for the beams.

In some examples of the method, apparatuses, and non-transitory computer-readable medium described herein, the feedback information includes information about the angle of departure, information about reception array of the UE used to receive a signal transmitted using a beam of the first ordered set of beams, or a combination thereof.

In some examples of the method, apparatuses, and non-transitory computer-readable medium described herein, the set of reference signals includes channel state information reference signals (CSI-RSs), demodulation reference signals (DMRSs), primary synchronization signals (PSSs), secondary synchronization signals (SSSs), or physical broadcast channel (PBCH) signals, or a combination thereof.

Some examples of the method, apparatuses, and non-transitory computer-readable medium described herein may further include operations, features, means, or instructions for identifying a gap time between transmissions of the set of reference signals based on the feedback information indicating that the UE will change reception arrays to receive two adjacent signals of the set of reference signals, where transmitting the set of reference signals using the second ordered set of beams may be based on identifying the gap time.

In some examples of the method, apparatuses, and non-transitory computer-readable medium described herein, the set of reference signals may be transmitted during an off-period of the DRX mode of the UE.

In some examples of the method, apparatuses, and non-transitory computer-readable medium described herein, the UE may be in a connected discontinuous reception (C-DRX) mode.

In some examples of the method, apparatuses, and non-transitory computer-readable medium described herein, the feedback information may be received during an on-period of a DRX cycle or during an off-period of the DRX cycle.

A method of wireless communication is described. The method may include receiving, by a UE operating in a DRX mode, a set of reference signals in a first ordered set of beams, identifying a signal quality for a subset of reference signals received by the UE, transmitting feedback information to a base station based on identifying the signal quality for the subset of reference signals, and receiving the set of reference signals in a second ordered set of beams that is different from the first ordered set of beams, the second ordered set of beams based on transmitting the feedback information.

An apparatus for wireless communication is described. The apparatus may include a processor, memory in electronic communication with the processor, and instructions stored in the memory. The instructions may be executable by the processor to cause the apparatus to receive, by a UE operating in a DRX mode, a set of reference signals in a first ordered set of beams, identify a signal quality for a subset of reference signals received by the UE, transmit feedback information to a base station based on identifying the signal quality for the subset of reference signals, and receive the set of reference signals in a second ordered set of beams that is different from the first ordered set of beams, the second ordered set of beams based on transmitting the feedback information.

Another apparatus for wireless communication is described. The apparatus may include means for receiving, by a UE operating in a DRX mode, a set of reference signals in a first ordered set of beams, identifying a signal quality for a subset of reference signals received by the UE, transmitting feedback information to a base station based on identifying the signal quality for the subset of reference signals, and receiving the set of reference signals in a second ordered set of beams that is different from the first ordered set of beams, the second ordered set of beams based on transmitting the feedback information.

A non-transitory computer-readable medium storing code for wireless communication is described. The code may include instructions executable by a processor to receive, by a UE operating in a DRX mode, a set of reference signals in a first ordered set of beams, identify a signal quality for a subset of reference signals received by the UE, transmit feedback information to a base station based on identifying the signal quality for the subset of reference signals, and receive the set of reference signals in a second ordered set of beams that is different from the first ordered set of beams, the second ordered set of beams based on transmitting the feedback information.

Some examples of the method, apparatuses, and non-transitory computer-readable medium described herein may further include operations, features, means, or instructions for identifying a first beam to be used to communicate a wake-up signal with the UE based on identifying the signal quality for the subset of reference signals, where receiving the set of reference signals in the second ordered set of beams may be based on identifying the first beam.

Some examples of the method, apparatuses, and non-transitory computer-readable medium described herein may further include operations, features, means, or instructions for identifying a second beam to be used to communicate the wake-up signal based on identifying the signal quality for the subset of reference signals, where receiving the set of reference signals in the second ordered set of beams may be based on identifying the second beam.

In some examples of the method, apparatuses, and non-transitory computer-readable medium described herein, the first beam may be positioned before the second beam in the second ordered set of beams.

In some examples of the method, apparatuses, and non-transitory computer-readable medium described herein, the first beam may be adjacent to the second beam in the second ordered set of beams.

Some examples of the method, apparatuses, and non-transitory computer-readable medium described herein may further include operations, features, means, or instructions for receiving the wake-up signal using the first beam or the second beam during an on-period of the DRX mode of the UE based on transmitting the feedback information.

Some examples of the method, apparatuses, and non-transitory computer-readable medium described herein may further include operations, features, means, or instructions for ranking the beams of the first ordered set of beams based on identifying the signal quality for the subset of reference signals, where the feedback information may be based on ranking the beams.

In some examples of the method, apparatuses, and non-transitory computer-readable medium described herein, identifying the signal quality for each signal further may include operations, features, means, or instructions for identifying a RSRP, a RSRQ, a SNR, a SNIR, or a combination thereof for the subset of reference signals.

Some examples of the method, apparatuses, and non-transitory computer-readable medium described herein may further include operations, features, means, or instructions for selecting a beam index of a beam of the first ordered set of beams to be used to communicate a wake-up signal, where the feedback information may be based on selecting the beam index.

Some examples of the method, apparatuses, and non-transitory computer-readable medium described herein may further include operations, features, means, or instructions for identifying an angle of departure of the subset of reference signals or a reception array used to receive the subset of reference signals, where the feedback information includes information related to the angle of departure or the reception array of the subset of reference signals, where receiving the set of reference signals in the second ordered set of beams may be based on identifying the angle of departure or the reception array used to receive the subset of reference signals.

In some examples of the method, apparatuses, and non-transitory computer-readable medium described herein, the set of reference signals includes CSI-RSs, DMRSs, PSSs, or SSSs, or a combination thereof.

Some examples of the method, apparatuses, and non-transitory computer-readable medium described herein may further include operations, features, means, or instructions for configuring a reception array during a gap time between transmissions of the set of reference signals, where receiving the set of reference signals in the second ordered set of beams may be based on configuring the reception array during the gap time.

In some examples of the method, apparatuses, and non-transitory computer-readable medium described herein, the set of reference signals may be received during an off-period of the DRX mode of the UE.

In some examples of the method, apparatuses, and non-transitory computer-readable medium described herein, the UE may be in a connected discontinuous reception (C-DRX) mode.

In some examples of the method, apparatuses, and non-transitory computer-readable medium described herein, the UE transmits the feedback information during an on-period of a DRX cycle or during an off-period of the DRX cycle.

In some examples of the method, apparatuses, and non-transitory computer-readable medium described herein, a number of reference signals of the subset of reference signals is less than a number of reference signals of the set of reference signals.

DETAILED DESCRIPTION

In some wireless communications systems, a user equipment (UE) may enter a discontinuous reception (DRX) mode to conserve power. In wireless communications systems that use directional beams to establish communication links, the UE may perform beam management procedures while the UE is operating in the DRX mode. Such beam management procedures may consume power and may reduce the benefits to the UE for operating in the DRX mode.

Techniques are described herein for reordering beams used to transmit reference signals for subsequent beam sweeps of a beam management procedure. Beams used to transmit reference signals may be hierarchically ordered to enable the UE to terminate the beam management procedure early and thereby conserve power. A base station may transmit reference signals using a first ordered set of beams as part of a first beam sweep. The UE may transmit feedback information to the base station about the signal quality for at least some of the reference signals. The base station may generate a second ordered set of beams based on the feedback information. The base station may transmit the reference signals using the second ordered set of beams as part of a second beam sweep. If the UE determines that a reference signal satisfies a threshold, the UE may terminate the beam management procedure early.

Aspects of the disclosure are initially described in the context of a wireless communications system. Aspects of the disclosure are described in the context of wireless communication systems and procedures. Aspects of the disclosure are further illustrated by and described with reference to apparatus diagrams, system diagrams, and flowcharts that relate to techniques to order direction signals during discontinuous reception.

Figure 1:
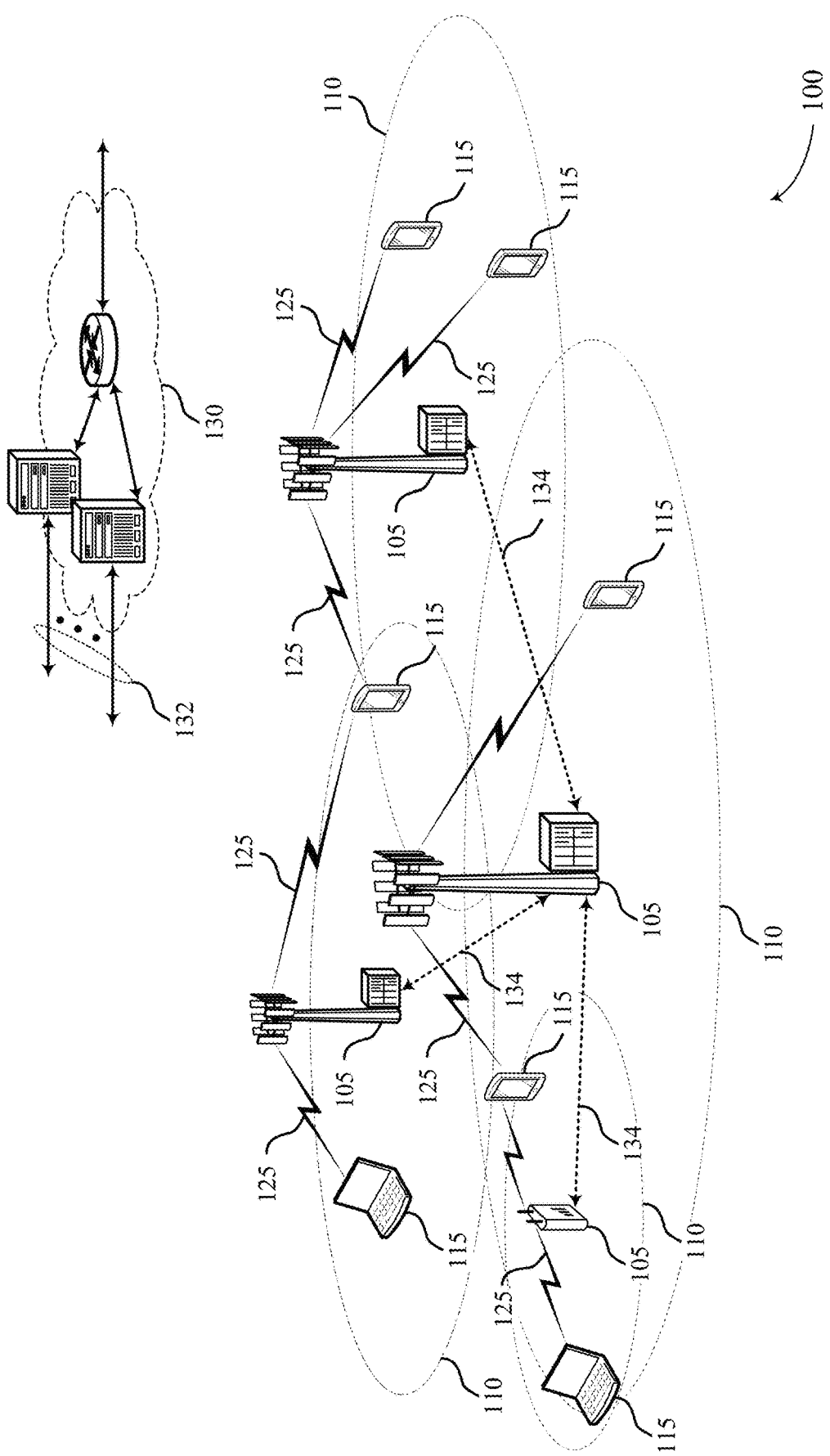
FIG. 1 illustrates an example of a wireless communications system that supports techniques to order direction signals during discontinuous reception in accordance with aspects of the present disclosure.

FIG. 1 illustrates an example of a wireless communications system 100 that supports techniques to order direction signals during discontinuous reception in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a base station 105 may reorder beams used to transmit reference signals for subsequent beam sweeps of a beam management procedure. Beams used to transmit reference signals may be hierarchically ordered to enable a UE 115 to terminate the beam management procedure early and thereby conserve power while operating in a discontinuous reception mode. A base station 105 may transmit reference signals using a first ordered set of beams as part of a first beam sweep. The UE 115 may transmit feedback information to the base station 105 about the signal quality for at least some of the reference signals. The base station 105 may generate a second ordered set of beams based on the feedback information. The base station 105 may transmit the reference signals using the second ordered set of beams as part of a second beam sweep. If the UE 115 determines that a reference signal satisfies a threshold, the UE 115 may terminate the beam management procedure early.

Figure 2:
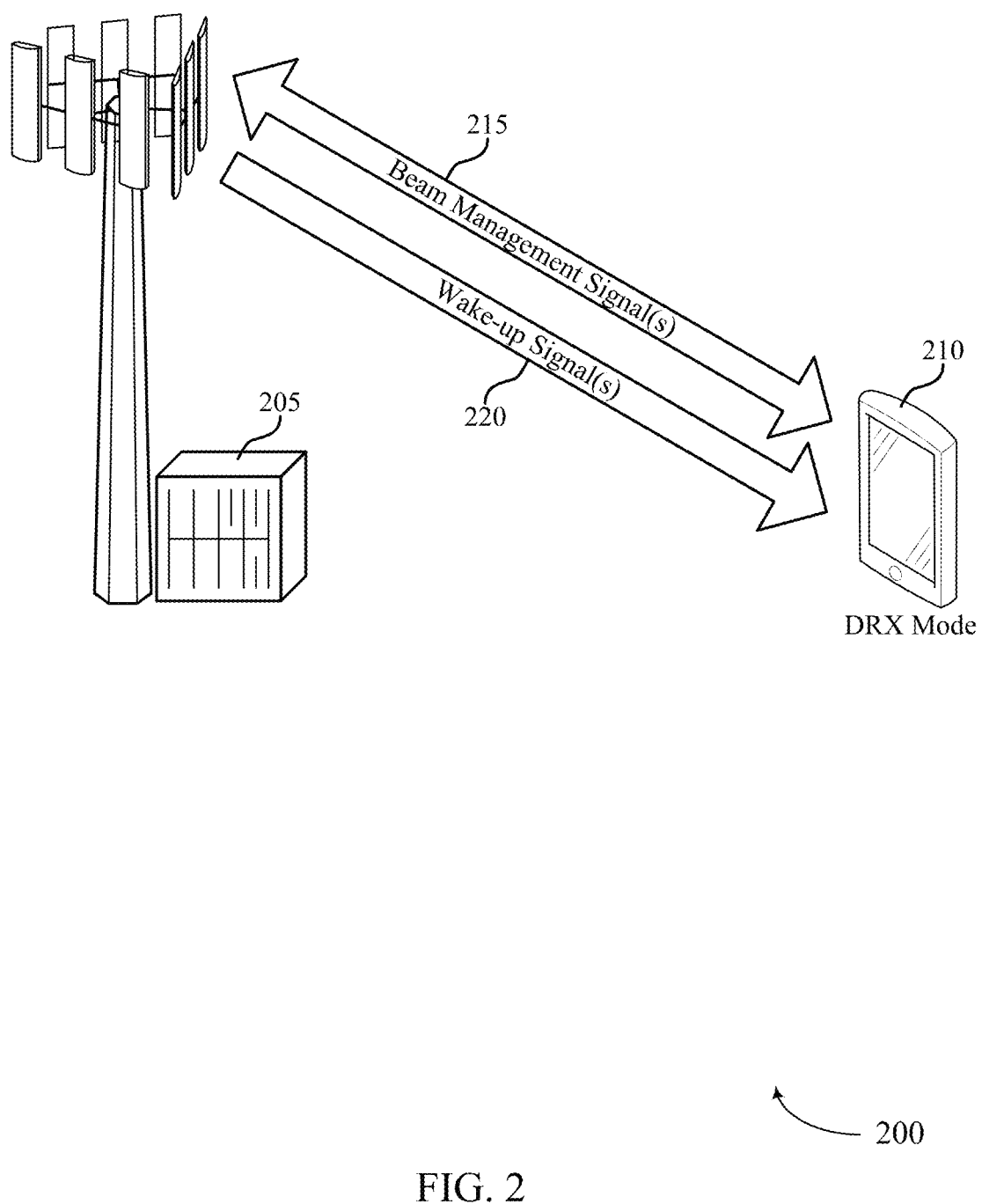
FIG. 2 illustrates an example of a wireless communications system that supports techniques to order direction signals during discontinuous reception in accordance with aspects of the present disclosure.

FIG. 2 illustrates an example of a wireless communications system 200 that supports techniques to order direction signals during discontinuous reception in accordance with aspects of the present disclosure. In some examples, the wireless communications system 200 may implement aspects of wireless communications system 100. The wireless communications system 200 may include one or more base stations 205 and one or more UEs 210. The base stations 205 may be examples of the base stations 105 described with reference to FIG. 1. The UEs 210 may be examples of the UEs 115 described with reference to FIG. 1.

In the wireless communications system 200, UEs 210 may be configured to enter a DRX mode to conserve power. Many UEs 210 may be battery-powered devices that may want to conserve power when not being used actively. Once way to conserve power is to enter a DRX mode. In some cases, the UE 210 may enter a C-DRX. With a DRX mode, during an off-period, the UE 210 may not be allowed to transmit various signals. Such a condition may allow the UE 210 to conserve power by not having its transmit chains and/or receive chains active and it may allow the base station 205 to assign these resources to other UEs to increase the efficiency of resource utilization.

In some cases, the wireless communications system 200 may communicate with the UE 210 using one or more directional beams. To maintain a communication link established using directional beams, the base station 205 and/or the UE 210 may perform one or more beam management procedures. These beam management procedures may be performed periodically to maintain the communication link. Directional beams serve a more limited geographic area than wider beams or omni-directional beams. As such, as the UE 210 moves through the network, the communication links that use directional beams are more susceptible to failure or fading.

A beam management procedure may include the transmission of beam management signals 215 in both uplink and downlink. For example, the base station 205 may transmit a set of reference signals using a plurality of different beams (e.g., a plurality of difference directions). Examples of the reference signals may include channel state information reference signals (CSI-RSs), demodulation reference signals (DMRSs), primary synchronization signals (PSSs), secondary synchronization signals (SSSs), or physical broadcast channel (PBCH) signals, or a combination thereof. The UE 210 may listen for these reference signals, may measure channel conditions for these reference signals, and my select one or more beams (e.g., beams with the best channel conditions) to use for future communications. The UE 210 may report the channel condition information or the selected beams to the base station 205. Similar procedures may be performed for uplink communications as part of a beam management procedure. Using this information, the base station 205 may adjust the beam(s) used for the communication link with the UE 210. In such a manner, the base station 205 and the UE 210 may use beam management procedures to maintain a communication link, even when UEs 210 are moving through a coverage area.

When a UE 210 operates in a DRX mode, the beam management procedures used to maintain the communication link may consume more power than the UE 210 desires. Because directional beams are sensitive to movement by the UE 210, beam management procedures may be performed more frequently than other link management procedures in more omni-directional networks.

Further, the base station 205 may configure wake-up signals 220 to be communicated using certain directional beams. Even in a DRX mode, the base station 205 and the UE 210 may maintain active beams to ensure that wake-up signals 220 are detectable by the UE 210. A wake-up signal 220 may be transmitted to a UE 210 operating in a DRX mode during an on-period of the DRX mode. The wake-up signal 220 may indicate to the UE 210 that the base station 205 has information waiting to be transmitted to the UE 210. Upon receiving the wake-up signal 220, the UE 210 may enter an active mode and activate its transmit/receive chains to receive the information from the base station 205.

Techniques are described herein for performing beam management procedures while the UE 210 is in a DRX mode. In some beam management procedures that occur during the DRX mode, the base station 205 may reorder the beams used to transmit reference signals based on feedback from the UE 210. In such a reordering, beams with better channel conditions may be transmitted earlier in the beam sweep of the beam management procedure. The UE 210 may listen to the beam sweep and may enter a sleep mode or a micro-sleep mode based on the selected beam providing an adequate signal quality.

Figure 3:
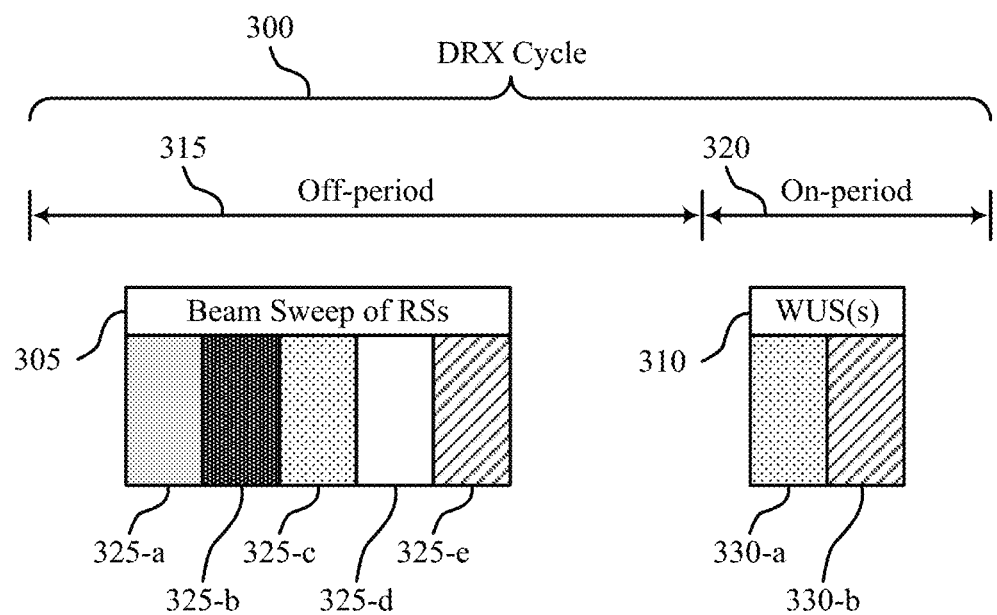
FIG. 3 illustrates an example of a discontinuous reception (DRX) cycle that supports techniques to order direction signals during discontinuous reception in accordance with aspects of the present disclosure.

FIG. 3 illustrates an example of a DRX cycle 300 that supports techniques to order direction signals during discontinuous reception in accordance various aspects of the present disclosure. In some examples, the DRX cycle 300 may implement aspects of the wireless communications systems 100 or 200.

The DRX cycle 300 illustrates how a beam sweep 305 of reference signals (e.g., beam management procedure) and wake-up signals 310 may be communicated during a DRX cycle 300. The DRX cycle 300 may include an off-period 315 and an on-period 320. The DRX cycle 300 may represent one off-period 315 and one on-period 320. During the on-period 320, a UE 210 may monitor a physical downlink control channel (PDCCH) (e.g., for a wake-up signal 310). During the off-period 315, the UE 210 may enter a sleep state and not monitor certain channels. During the off-period 315, the UE 210 may conserve energy by deactivating certain components used for reception and/or transmission.

In some cases, to maintain a communication link that uses directional beams, the base station 205 and the UE 210 may perform a beam management procedure during the off-period 315 of the DRX cycle 300. At least a portion of the beam management procedure may include the base station 205 transmitting the reference signals 325 in a beam sweep 305. The reference signals 325 may be transmitted using a plurality of different beams or in a plurality of different directions. For example, a first reference signal 325-a may be transmitted in a first direction, a second reference signal 325-b may be transmitted in a second direction, a third reference signal 325-c may be transmitted in a third direction, a fourth reference signal 325-d may be transmitted in a fourth direction, a fifth reference signal 325-e may be transmitted in a fifth direction, etc.

The UE 210 may provide feedback information to the base station 205 indicating one or more of the beams associated with the reference signals 325 that may be used for wake-up-signals. For example, the UE 210 may indicate that the beam associated with the reference signal 325-c may be used for a wake-up signal 330-a and a beam associated with the reference signal 325-e may be used for a wake-up signal 330-b. Additional details about some of these operations are described with reference to FIG. 4.

To reduce the amount of power consumed by the UE 210 operating in the DRX mode while performing a beam management procedure, the base station 205 may order the beams used during the beam sweep 305. In some cases, the base station 205 may position the beams preferred by the UE 210 early in the beam sweep. In such cases, the UE 210 may immediately re-enter a sleep mode upon detecting channel conditions of at least one beam satisfies a threshold for maintaining a communication link.

Figure 4:
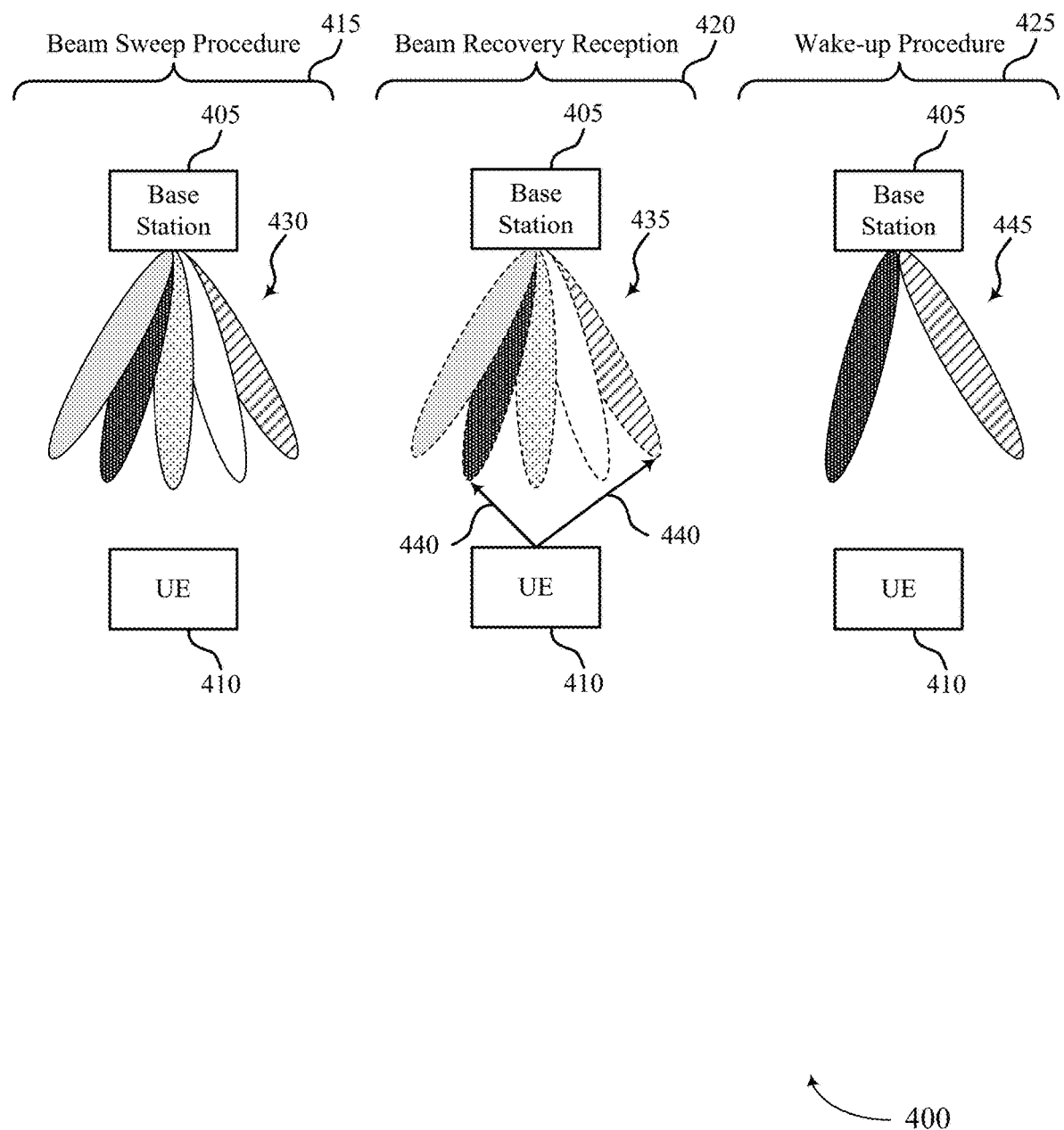
FIG. 4 illustrates examples of DRX procedures that support techniques to order direction signals during discontinuous reception in accordance with aspects of the present disclosure.

FIG. 4 illustrates examples of DRX procedures 400 that support techniques to order direction signals during discontinuous reception in accordance with aspects of the present disclosure. In some examples, the DRX procedures 400 may implement aspects of the wireless communications systems 100 or 200. The DRX procedures 400 include operations performed by and communications exchanged between base stations 405 and UEs 410. The base stations 405 may be examples of the base stations 105 and 205 described with reference to FIGS. 1-3. The UEs may be examples of the UEs 115 and 210 described with reference to FIGS. 1-3.

The DRX procedures 400 may include a beam sweep procedure 415, a beam recovery reception procedure 420, and a wake-up procedure 425. In some cases, the beam sweep procedure 415 and the beam recovery reception procedure 420 may be at least a portion of a beam management procedure.

During a beam sweep procedure 415, the base station 405 may transmit reference signals using a plurality of beams 430. For example, a reference signal may be transmitted using each beam. Each beam of the plurality of beams 430 may represent a unique beam configuration used during the beam sweep procedure 415. In some cases, each beam may be pointed in a different direction. The beam sweep procedure 415 may be performed during an off-period of the DRX cycle. Examples of reference signals may include CSI-RSs, DMRSs, PSSs, SSSs, or combinations thereof.

The UE 410 may listen for reference signals that use beams already designated for use by the base station 405 and the UE 410. For example, if the communication link between the base station 405 and the UE 410 uses the third beam of the plurality of beams 430. The UE 410 may measure a signal quality of that beam. If the preconfigured beam satisfies a signal quality threshold, the UE 410 may cease listening to other reference signals and may enter a sleep mode. In such situations, the UE 410 may not transmit any feedback information to the base station 405. The base station 405 may interpret the silence from the UE 410 as indicating that the communication link is adequate as currently configured.

If the preconfigured beam fails to satisfy the signal quality threshold, the UE 410 may listen for the reference signals during the beam sweep procedure 415. The UE 410 may measure a signal quality of each of the reference signals received from the base station 405. Examples of the signal qualities that may be measured by the UE 410 may include received signal received power (RSRP), received signal received quality (RSRQ), a signal-to-noise ratio (SNR), a signal-to-interference-plus-noise ratio (SNIR), or a combination thereof.

In some cases, the UE 410 may select one or more beams to be used for future communications (e.g., wake-up signals). In such cases, the UE 410 may select a beam or a beam index from the beams 430 to be used to communicate a wake-up signal. In some cases, the UE 410 may identify a first beam to communicate the wake-up signal during an on-period of the DRX cycle.

The UE 410 may transmit feedback information to the base station 405 about the signal conditions measured for the reference signals. In some cases, the feedback information may include RSRP, RSPQ, SNR, SNIR, or other measured quantities. In these cases, the base station 405 may select beams to use for wake-up signals. In some cases, the feedback information may include beam indexes of beams selected by the UE 410 to use for wake-up signals that satisfy respective thresholds. In some cases, the feedback information may indicate a primary beam preference and at least one or more secondary beam preferences. In such cases, the base station 405 may place the primary beam preference as the highest priority and the one or more secondary beam preferences as lower priorities.

In some cases, the UE 410 may use a beam recovery reception procedure 420 to report the feedback information. During a beam recovery reception procedure 420, the base station 405 may configure its receive chains with a plurality of reception configurations 435. The base station 405 may sweep through the reception configurations 435. In some cases, there is a one-to-one mapping between beams 430 used during the beam sweep procedure 415 and reception configurations 435 used during the beam recovery reception procedure 420.

The UE 410 may transmit one or more beam recovery signals 440 for each beam selected by the UE 410 for future communications (e.g., selected for use by wake-up signals). The UE 410 may transmit the beam recovery signals 440 to coincide with the reception configuration 435 that is associated with the selected beam. For example, the UE 410 may transmit a beam recovery signal 440 during a second reception configuration and a fifth reception configuration. This indicates that the UE 410 would prefer to communicate during using the second beam and fifth beam from the plurality of beams 430.

During the wake-up procedure 425, the base station 405 may transmit wake-up signals using the one or more selected beams 445. The wake-up procedure may be performed during an on-period of the DRX cycle of the UE 410. If the UE 410 determines that the base station 405 includes information waiting to be transmitted to the UE 410, the UE 410 may enter an active mode and receive the information from the base station 405.

In some cases, the beam sweep procedure 415 and the beam recovery reception procedure 420 may be performed during an off-period of a DRX cycle. In other cases, the base station 405 and/or the UE 410 may be configured to periodically perform the beam sweep procedure 415 and/or beam recovery reception procedure 420 during the on-period of the DRX cycle. In such situations, the UE 410 may be able to conserve some power by performing the beam management procedures during the on-period rather than during the off-period.

Figure 5:
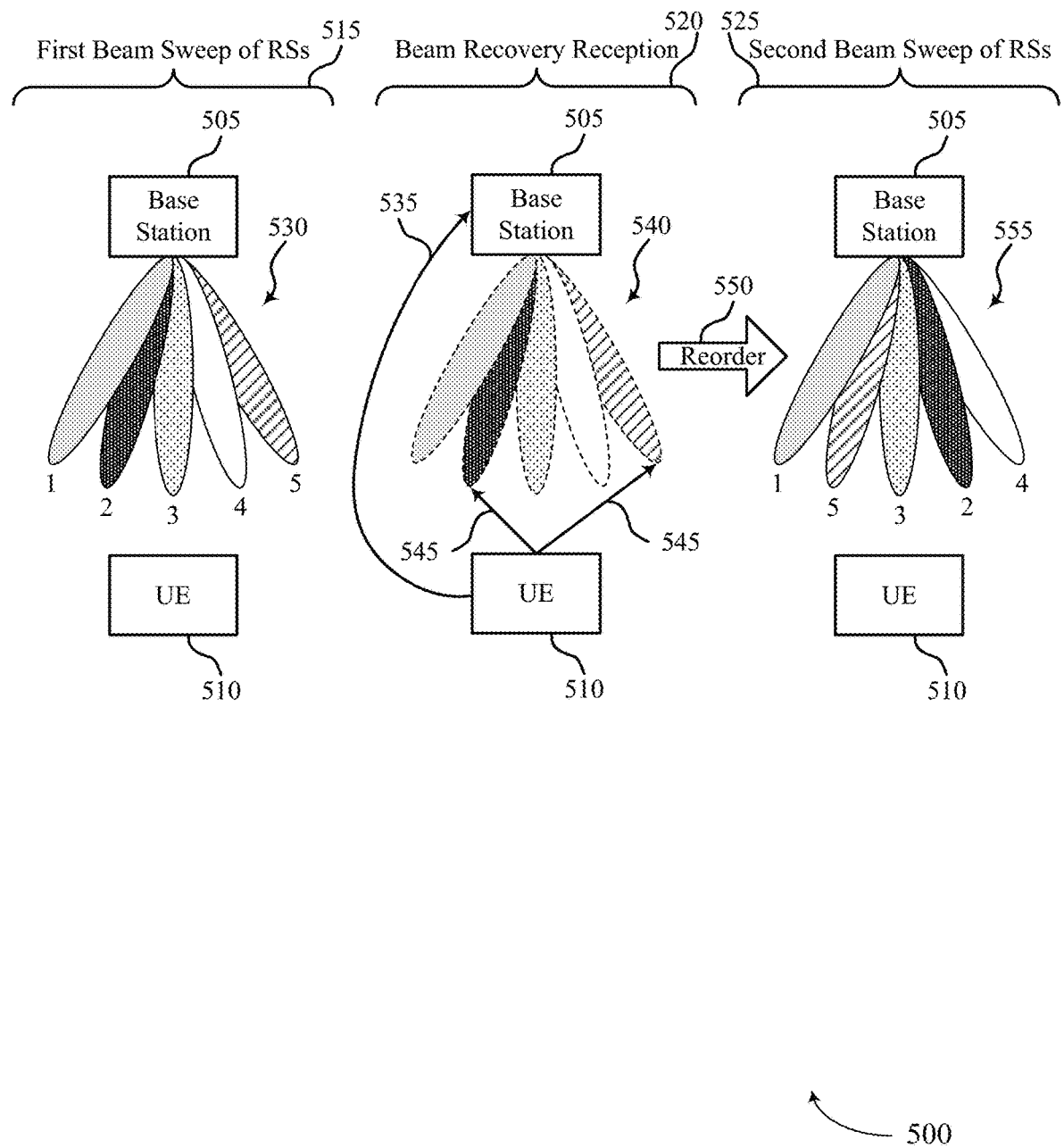
FIG. 5 illustrates an example of a beam management procedure that supports techniques to order direction signals during discontinuous reception in accordance with aspects of the present disclosure.

FIG. 5 illustrates an example of a beam management procedure 500 that supports techniques to order direction signals during discontinuous reception in accordance with aspects of the present disclosure. In some examples, beam management procedure 500 may implement aspects of the wireless communications systems 100 or 200. The beam management procedures 500 include operations performed by and communications exchanged between base stations 505 and UEs 510. The base stations 505 may be examples of the base stations 105, 205, and 405 described with reference to FIGS. 1-4. The UEs may be examples of the UEs 115, 210, and 410 described with reference to FIGS. 1-4.

The beam management procedures 500 illustrate techniques for reordering the beams used to transmit reference signals to reduce the power consumption of the UEs 510 operating in a DRX mode. In some cases, the beam management procedures 500 may occur during an off-period of the DRX cycle associated with a UE 510 operating in a DRX mode.

During a first beam sweep procedure 515, the base station 505 may transmit reference signals using a first ordered set of beams 530. For example, a reference signal may be transmitted using each beam. Each beam of the first ordered set of beams 530 may represent a unique transmit beam configuration used during the first beam sweep procedure 515. The first ordered set may include an order of beams used to transmit reference signals. For example, the first ordered set of beams 530 may include a first beam 1 used to transmit a first reference signal, a second beam 2 used to transmit a second reference signal, a third beam 3 used to transmit a first reference signal, a fourth beam 4 used to transmit a first reference signal, and a fifth beam 5 used to transmit a first reference signal. In some cases, each beam may be pointed in a different direction. Examples of reference signals may include CSI-RSs, DMRSs, PSSs, SSSs, or combinations thereof.

The UE 510 may listen for reference signals that use beams already designated for use by the base station 505 and the UE 510. For example, if the communication link between the base station 505 and the UE 510 uses the third beam 3 of the first ordered set of beams 530. The UE 510 may measure a signal quality of the third beam 3. If the preconfigured beam (e.g., third beam 3) satisfies a signal quality threshold, the UE 510 may cease listening to other reference signals may go back to sleep. In effect, if there has been no signal degradation of the beam used for the communication link, the UE 510 may terminate its listening for reference signals, thereby conserving power. In such situations, the UE 510 may not transmit any feedback information to the base station 505. The base station 505 may interpret the silence from the UE 510 as stating that the communication link is fine as currently configured.

If the preconfigured beam (e.g., third beam 3) fails to satisfy the signal quality threshold, the UE 510 may listen for the other reference signals during the first beam sweep procedure 515. The UE 510 may measure a signal quality of at least some of the reference signals transmitted using the first ordered set of beams 530 received from the base station 505. Examples of the signal qualities that may be measured by the UE 510 may include RSRP, RSRQ, SNR, SNIR, pathloss, or a combination thereof.

In some cases, the UE 510 may select one or more beams to be used for future communications (e.g., wake-up signals). In such cases, the UE 510 may select a beam or a beam index from the beams 530 to be used to communicate a wake-up signal. In some cases, the UE 510 may identify a first beam to communicate the wake-up signal during an on-period of the DRX cycle. In some cases, the UE 510 may select a new beam to use if the preconfigured beam (e.g., third beam 3) does not satisfy a threshold. For example, the UE 510 may select the second beam 2 and/or the fifth beam 5 for use in future communications.

In some cases, the UE 510 may rank the beams of the first ordered set of beams 530 based on signal quality of at least a subset of beams. For example, the ranking may be ordered from the reference signal with the best RSRP to the reference signal with the poorest RSRP). In this manner, future beam sweeps (e.g., the second beam sweep procedure 525) may be reordered in a hierarchical manner allowing the UE 510 to terminate a beam management procedure early upon determining that a certain reference signal communicated using a certain beam satisfies a threshold.

The UE 510 may transmit feedback information 535 to the base station 505 about the first ordered set of beams 530. The UE 510 may transmit the feedback information 535 in a variety manner. In some cases, the feedback information 535 may be communicated in a measurement report, a channel state information (CSI) report, or other reporting message. In some cases, the feedback information 535 may be communicated using the beam recovery reception procedure 520 and beam recovery signals 545. In some cases, the feedback information 535 may include information about the signal quality collected by the UE 510. For example, the feedback information 535 may include data about RSRP, RSPQ, SNR, SNIR, or other measured quantities of one or more of the beams of the first ordered set of beams 530. In these cases, the base station 505 may use the feedback information 535 to rank the first ordered set of beams 530 and reorder the first ordered set of beams to generate the second ordered set of beams 555. The UE 510 may transmit the feedback information 535 during an on-period or during an off-period of a DRX cycle.

In some cases, the feedback information 535 may include beam indexes of beams selected by the UE 510 from the first ordered set of beams 530. For example, the feedback information 535 may indicate a ranked list of beams from the first ordered set of beams 530. The ranked list generated by the UE 510 based on the signal quality of a subset of reference signals transmitted using the respective beam. In some examples, the feedback information 535 may include beam indexes for one or more beams selected by the UE 510 to be used for future communications (e.g., for wake-up signals). For example, the UE 510 may select a primary beam (e.g., fifth beam 5) for future transmissions and a secondary beam (e.g., beam 2) for future transmissions.

In some cases, the UE 510 may measure the radio frequency (RF) panel used to receive the reference signals. The UE 510 may include information regarding which RF panel was used to receive which beams of the first ordered set of beams 530. The base station 505 or the UE 510 may take this into account when generating the second ordered set of beams 555. For example, it may take additional time or additional power to switch RF panels during a beam sweep, the second ordered set of beams 555 may be ordered to reduce or minimize the number of RF panel switches the UE 510 may do during a beam sweep. In some cases, the UE 510 may communicate what RF panel the UE 510 uses to receive a beam, the capabilities of the UE 510, or whether the UE 510 had to switch RF panels when receiving the first ordered set of beams 530. The UE 510 may use PUCCH, PUSCH, sub-6 GHz channels, a buffer status report, or other messages to communicate the information about RF panels.

In some cases, the UE 510 may use a beam recovery reception procedure 520 to report the feedback information 535. During a beam recovery reception procedure 520, the base station 505 may configure its receive antennas or receive chains with a plurality of reception configurations 540. The base station 505 may sweep through the reception configurations 540. In some cases, there may be a one-to-one mapping between the first ordered set of beams 530 used during the first beam sweep procedure 515 and reception configurations 540 used during the beam recovery reception procedure 520.

The UE 510 may transmit one or more beam recovery signals 545 for each beam selected by the UE 510 for future transmissions (e.g., selected for use by wake-up signals). In some cases, the beam recovery signals 545 may include any of the feedback information 535 described herein. The UE 510 may transmit the beam recovery signals 545 to coincide with the reception configuration 540 that is associated with the selected beam. For example, the UE 510 may transmit a beam recovery signal 545 during a second reception configuration and a fifth reception configuration. The transmission of the beam recovery signals 545 may indicate that the UE 510 would prefer to communicate during using the second beam and fifth beam from the plurality of beams 530. In some cases, the UE 510 may transmit a beam recovery signal 545 for each reception configuration 540. In such cases, each beam recovery signal 545 may include feedback information for its associated beam.

At 550, the base station 505 may reorder the first ordered set or beams 530 to generate the second ordered set of beams 555 based on the feedback information 535. By reordering the beams, the base station 505 may establish a hierarchy of reference signal transmission that allows the UE 510 operation in a DRX mode to terminate a procedure early if certain conditions are met. For example, if the UE 510 determines that its preconfigured beam satisfies a threshold, the UE 510 may cease listening and analyzing other beams in the beam sweep.

In some cases, the base station 505 may receive feedback information 535 that includes data about the signal quality of the beams received by the UE 510. In such cases, the base station 505 may identify beams for future transmissions or may rank the beams of the first ordered set of beams 530 according to their signal quality. For example, the base station 505 may identify a new order of beams for the second ordered set of beams 555 based on the analysis of the signal quality data. To do this, the base station 505 may compare the signal quality data to threshold(s) or to other signal quality data, or both.

In some cases, the base station 505 may receive feedback information 535 that includes references or rankings of beams. In such cases, the base station 505 may identify a new order of beams for the second ordered set of beams 555 based on determinations made by the UE 510. In such cases, the feedback information 535 may include beam indexes or lists of beam indexes.

In some cases, the base station 505 may insert a gap between ordered beams in the second ordered set of beams 555. The UE 510 may use the gap to decode the previous reference signal transmitted using a previous beam, check to see if decoding the next reference signal is necessary or not, reconfigure the RF panels (if needed), or a combination thereof. To determine the gap, the base station 505 may consider the angle of departure of each beam of the first ordered set of beams. The angle of departure information may be used a proxy to estimate whether the UE 510 may have to switch RF panels to receive adjacent beams. In some cases, the feedback information 535 includes information about the capabilities of the UE 510, whether the UE 510 had to switch RF panels during the first beam sweep procedure 515, or what RF panel was used to receive each beam of the first ordered set of beams, or a combination thereof. The base station 505 may use this information to determine the gap. In some cases, the gap may be configured to allow the UE 510 time to process the reference signal and terminate the beam sweep early if certain conditions are met. In some cases, the base station 505 may order the beams of the second ordered set of beams 555 in such a way that beams the UE 510 can receive with same subarray or RF panel are adjacent in the second ordered set of beams 555. In some cases, the gap may be a single symbol.

In some cases, the UE 510 may feedback the indices of three beams selected by the UE 510 to the base station 505. In some situations, however, the feedback information 535 may not explicitly mention the preferred order of some of the beams. For example, the feedback information 535 may not specify if the first beam is preferred over the second beam or vice-versa. In such cases, the base station 505 may order the beams based on which beams are adjacent.

The base station 505 generate the second ordered set of beams 555 based on the feedback information 535. The second ordered set of beams 555 may include the same beam configurations as the first ordered set of beams 530, except the beams are used to transmit reference signals in different order. For example, the second ordered set of beams 555 may include a first beam 1 used to transmit a first reference signal, a fifth beam 5 used to transmit a second reference signal, a third beam 3 used to transmit a first reference signal, a second beam 2 used to transmit a first reference signal, and a fourth beam 4 used to transmit a first reference signal.

The base station 505 may indicate information to the UE 510 about the second ordered set of beams 555. For example, the base station 505 may indicate to the UE 510 the order of the beams in the second ordered set of beams 555 (e.g., 1, 5, 3, 2, 4). In some cases, the base station 505 may inform the UE 510 how some beams are related. For example, the base station 505 may indicate how close a beam is to the preferred beam (e.g., the anchor beam). In such examples, the UE 510 may focus its search on beams that are adjacent to the preferred beam or beams that are subsequent to the anchored beams if the second ordered set of beams 555. In some cases, the base station 505 may indicate a proximity of beam to a preferred beam.

During the second beam sweep procedure 525, the base station 505 may transmit reference signals using the second ordered set of beams 555. The base station 505 and UE 510 may repeat the procedures discussed herein for the second ordered set of beams 555. The base station 505 and/or the UE 510 may continue reordering the beams any number of times while the UE 510 operates in the DRX mode. The second beam sweep procedure 525 may occur during an off-period of a second DRX cycle that is different than the DRX cycle used to perform the first beam sweep procedure 515.

When listening to the reference signals transmitted using the second ordered set of beams 555, the UE 510 may monitor the primary beam first (e.g., the beam with the best signal quality). If the signal quality of primary beam of the second ordered set of beams 555 does not satisfy a threshold, the UE 510 may monitor the beam with the second best signal quality. The UE 510 may compare this beam to the threshold. The UE 510 may use this hierarchal progression through the second ordered set of beams 555 to facilitate early termination of the procedure when a signal quality of a beam satisfies a threshold. In some cases, the second ordered set of beams 555 is ordered sequentially based on which beams have the best signal quality at the UE 510. If any reference signal transmitted using any beam satisfies the signal quality threshold, the UE 510 may terminate that particular beam management procedure.

In some cases, the base station 505 may be configured to receive feedback information 535 from a plurality of UEs 510. In such cases, the new order of beams in the second ordered set of beams 555 may be based on data from many different sources. In such cases, the base station 505 may analyze the feedback information from each UE and determine an order for the beams that benefits the entire network.

Figure 6:
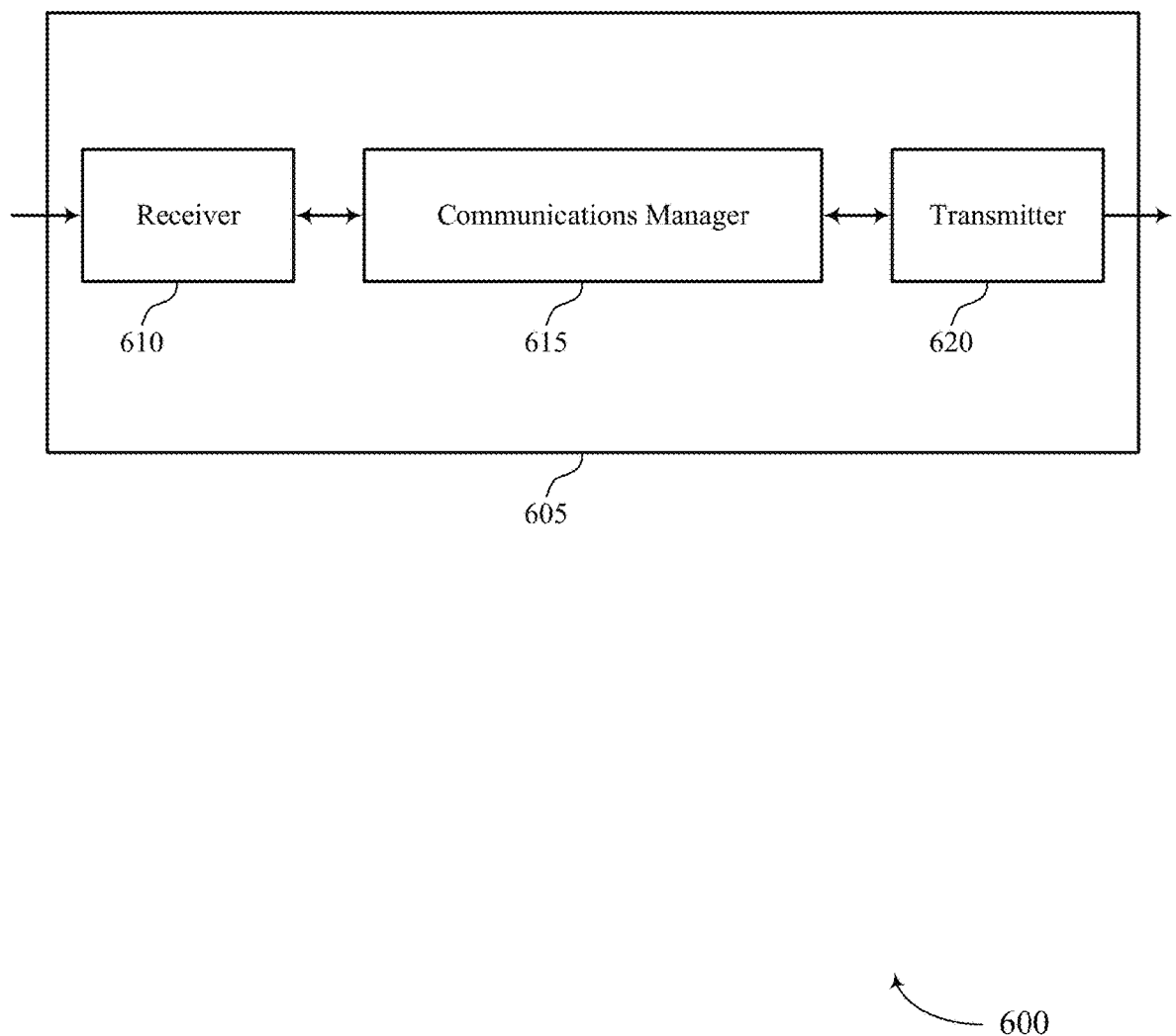
FIGS. 6 and 7 show block diagrams of devices that support techniques to order direction signals during discontinuous reception in accordance with aspects of the present disclosure.

FIG. 6 shows a block diagram 600 of a device 605 that supports techniques to order direction signals during discontinuous reception in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques to order direction signals during discontinuous reception, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, by a UE operating in a DRX mode, a set of reference signals in a first ordered set of beams, receive the set of reference signals in a second ordered set of beams that is different from the first ordered set of beams, the second ordered set of beams based on transmitting the feedback information, identify a signal quality for the subset of reference signals received by the UE, and transmit feedback information to a base station based on identifying the signal quality for the subset of reference signals. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
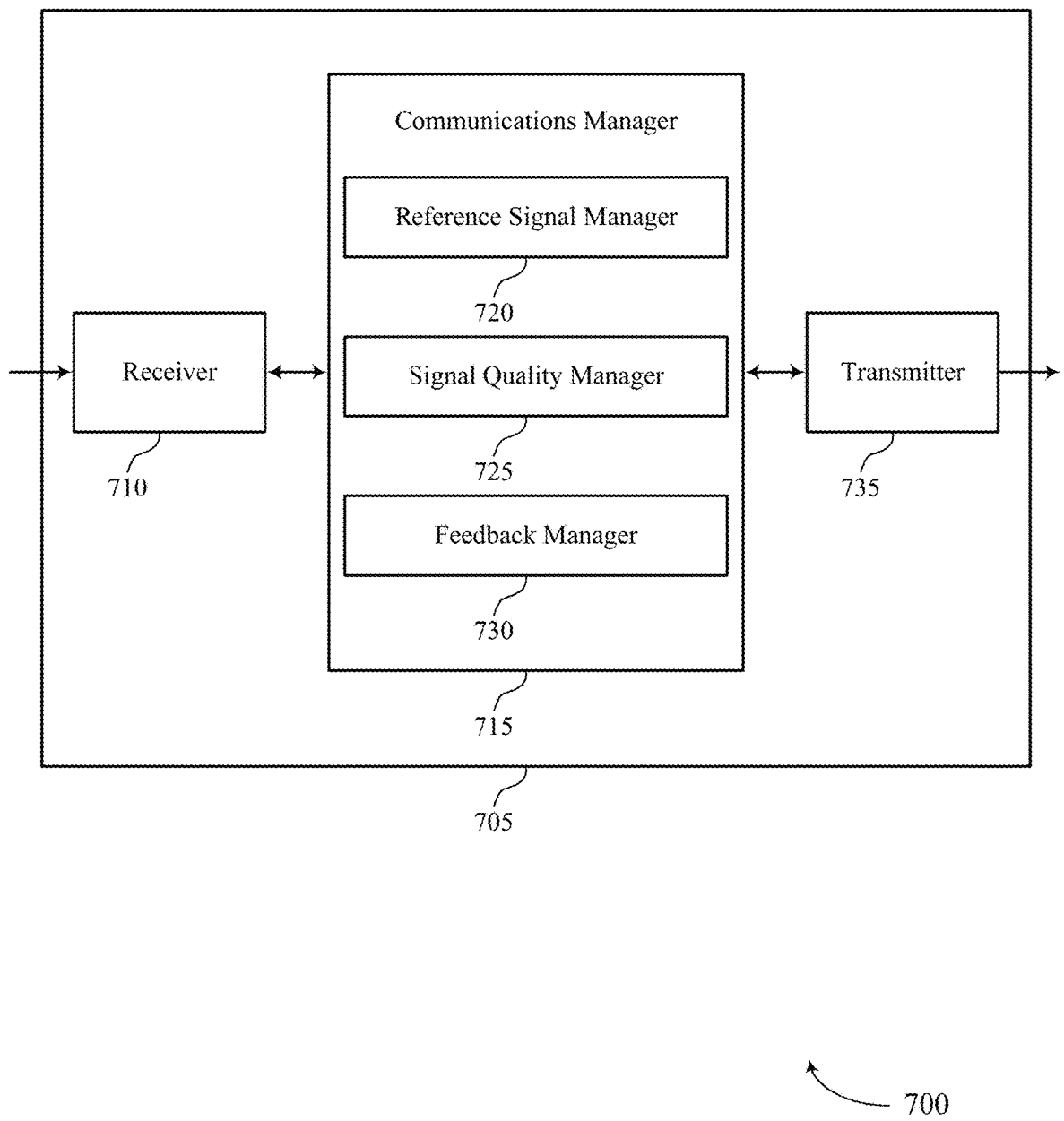

FIG. 7 shows a block diagram 700 of a device 705 that supports techniques to order direction signals during discontinuous reception in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques to order direction signals during discontinuous reception, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reference signal manager 720, a signal quality manager 725, and a feedback manager 730. The communications manager 715 may be an example of aspects of the communications manager 910 described herein.

The reference signal manager 720 may receive, by a UE operating in a DRX mode, a set of reference signals in a first ordered set of beams and receive the set of reference signals in a second ordered set of beams that is different from the first ordered set of beams, the second ordered set of beams based on transmitting the feedback information.

The signal quality manager 725 may identify a signal quality for the subset of reference signals received by the UE.

The feedback manager 730 may transmit feedback information to a base station based on identifying the signal quality for the subset of reference signals.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
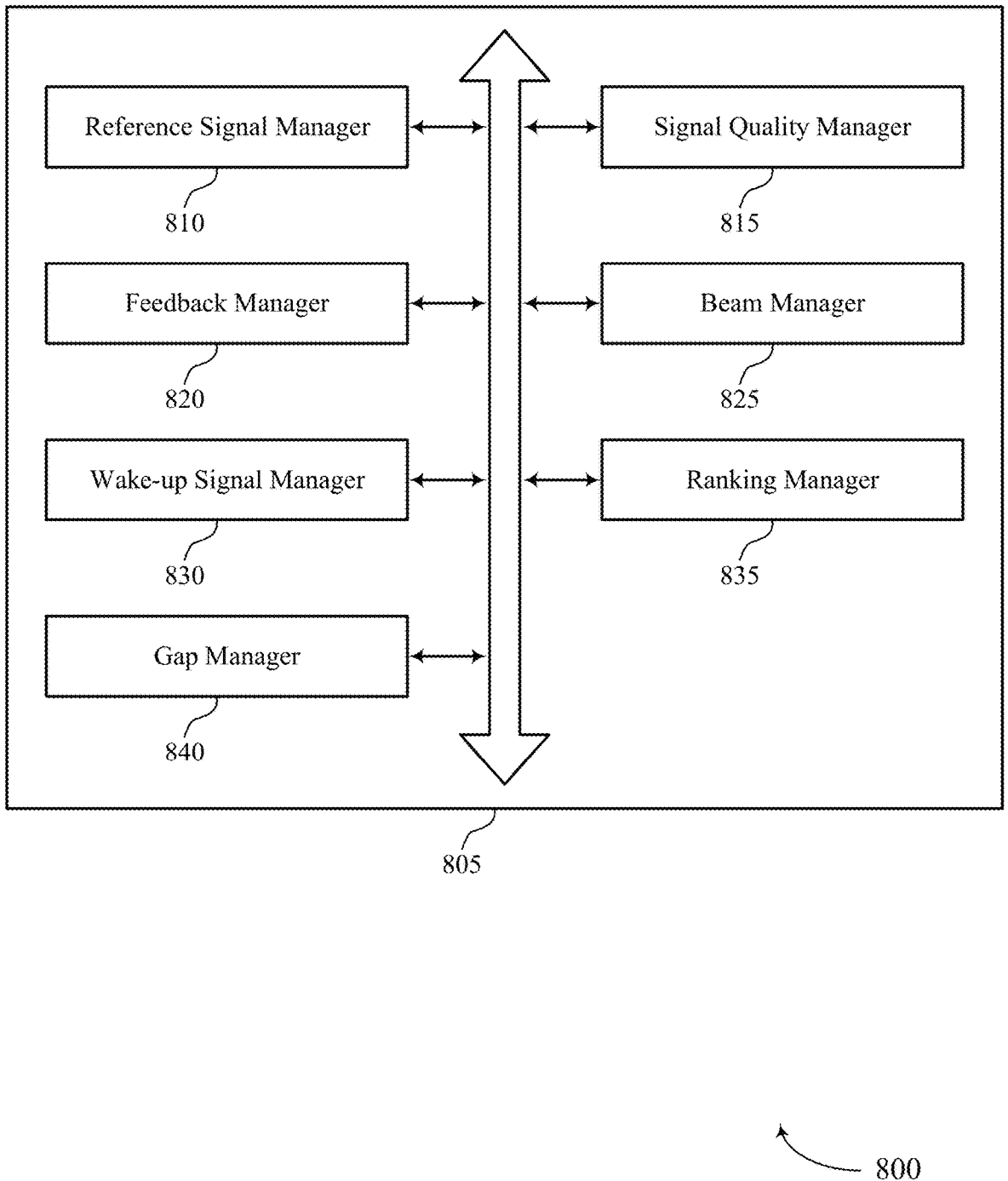
FIG. 8 shows a block diagram of a communications manager that supports techniques to order direction signals during discontinuous reception in accordance with aspects of the present disclosure.

FIG. 8 shows a block diagram 800 of a communications manager 805 that supports techniques to order direction signals during discontinuous reception in accordance with aspects of the present disclosure. The communications manager 805 may be an example of aspects of a communications manager 615, a communications manager 715, or a communications manager 910 described herein. The communications manager 805 may include a reference signal manager 810, a signal quality manager 815, a feedback manager 820, a beam manager 825, a wake-up signal manager 830, a ranking manager 835, and a gap manager 840. Each of these modules may communicate, directly or indirectly, with one another (e.g., via one or more buses).

The reference signal manager 810 may receive, by a UE operating in a DRX mode, a set of reference signals in a first ordered set of beams. In some examples, the reference signal manager 810 may receive the set of reference signals in a second ordered set of beams that is different from the first ordered set of beams, the second ordered set of beams based on transmitting the feedback information. In some cases, the set of reference signals includes CSI-RSs, DRMSs, PSSs, SSSs, or a combination thereof. In some cases, the set of reference signals are received during an off-period of the DRX mode of the UE.

The signal quality manager 815 may identify a signal quality for the subset of reference signals received by the UE. In some examples, the signal quality manager 815 may identify a RSRP, RSRQ, SNR, SNIR, or a combination thereof for the subset of reference signals.

The feedback manager 820 may transmit feedback information to a base station based on identifying the signal quality for the subset of reference signals. In some cases, the UE transmits the feedback information during an on-period of a DRX cycle or during an off-period of the DRX cycle.

The beam manager 825 may identify a first beam to be used to communicate a wake-up signal with the UE based on identifying the signal quality for the subset of reference signals, where receiving the set of reference signals in the second ordered set of beams is based on identifying the first beam. In some examples, the beam manager 825 may identify a second beam to be used to communicate the wake-up signal based on identifying the signal quality for the subset of reference signals, where receiving the set of reference signals in the second ordered set of beams is based on identifying the second beam.

In some examples, the beam manager 825 may select a beam index of a beam of the first ordered set of beams to be used to communicate a wake-up signal, where the feedback information is based on selecting the beam index. In some examples, the beam manager 825 may identify an angle of departure of the subset of reference signals or a reception array used to receive the subset of reference signals, where the feedback information includes information related to the angle of departure or the reception array of the subset of reference signals, where receiving the set of reference signals in the second ordered set of beams is based on identifying the angle of departure or the reception array used to receive the subset of reference signals. In some cases, the first beam is positioned before the second beam in the second ordered set of beams. In some cases, the first beam is adjacent to the second beam in the second ordered set of beams. In some cases, the UE is in a connected discontinuous reception (C-DRX) mode.

The wake-up signal manager 830 may receive the wake-up signal using the first beam or the second beam during an on-period of the DRX mode of the UE based on transmitting the feedback information.

The ranking manager 835 may rank the beams of the first ordered set of beams based on identifying the signal quality for the subset of reference signals, where the feedback information is based on ranking the beams.

The gap manager 840 may configure a reception array during a gap time between transmissions of the set of reference signals, where receiving the set of reference signals in the second ordered set of beams is based on configuring the reception array during the gap time.

Figure 9:
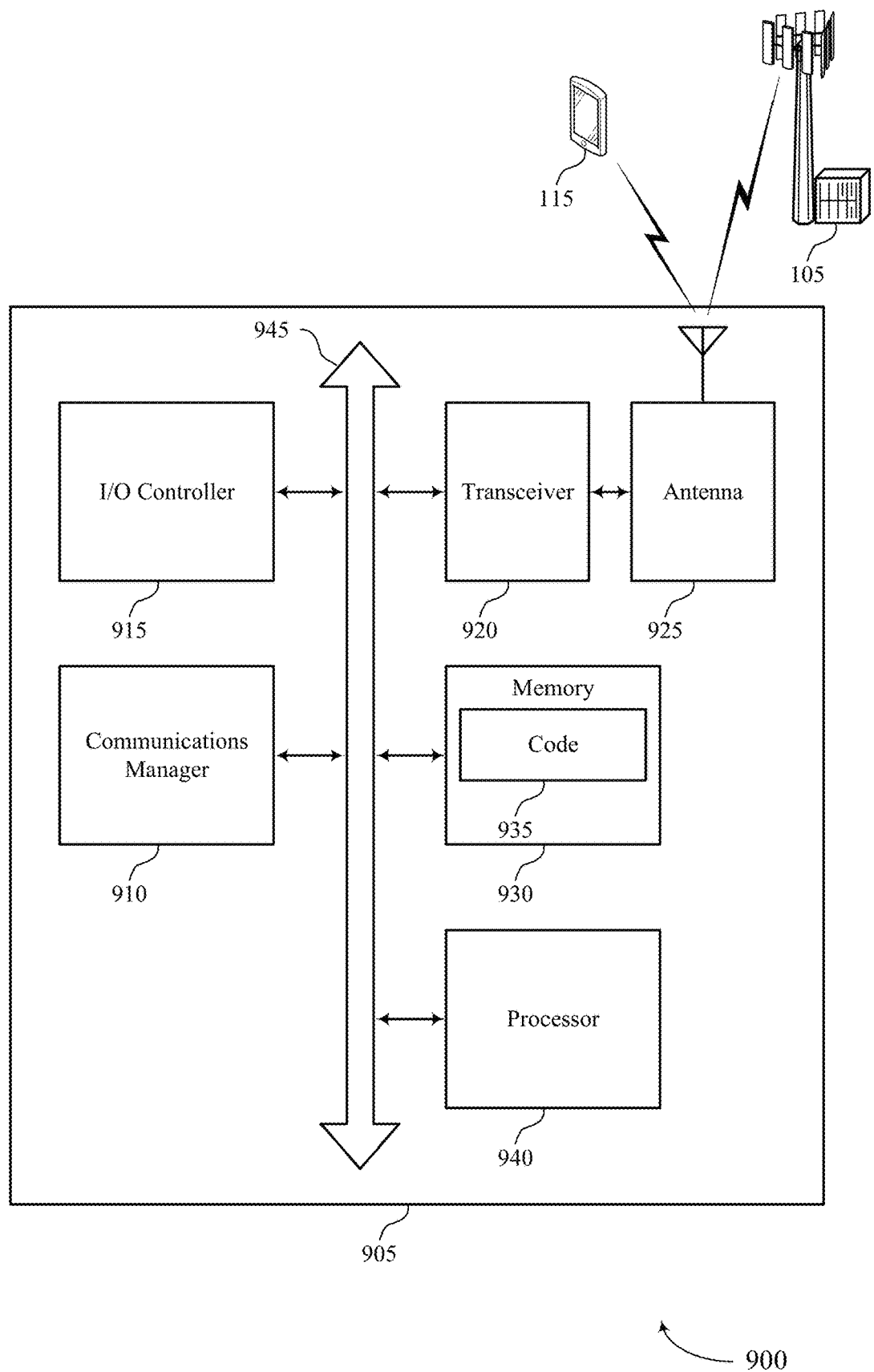
FIG. 9 shows a diagram of a system including a device that supports techniques to order direction signals during discontinuous reception in accordance with aspects of the present disclosure.

FIG. 9 shows a diagram of a system 900 including a device 905 that supports techniques to order direction signals during discontinuous reception in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, by a UE operating in a DRX mode, a set of reference signals in a first ordered set of beams, receive the set of reference signals in a second ordered set of beams that is different from the first ordered set of beams, the second ordered set of beams based on transmitting the feedback information, identify a signal quality for the subset of reference signals received by the UE, and transmit feedback information to a base station based on identifying the signal quality for the subset of reference signals.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques to order direction signals during discontinuous reception).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
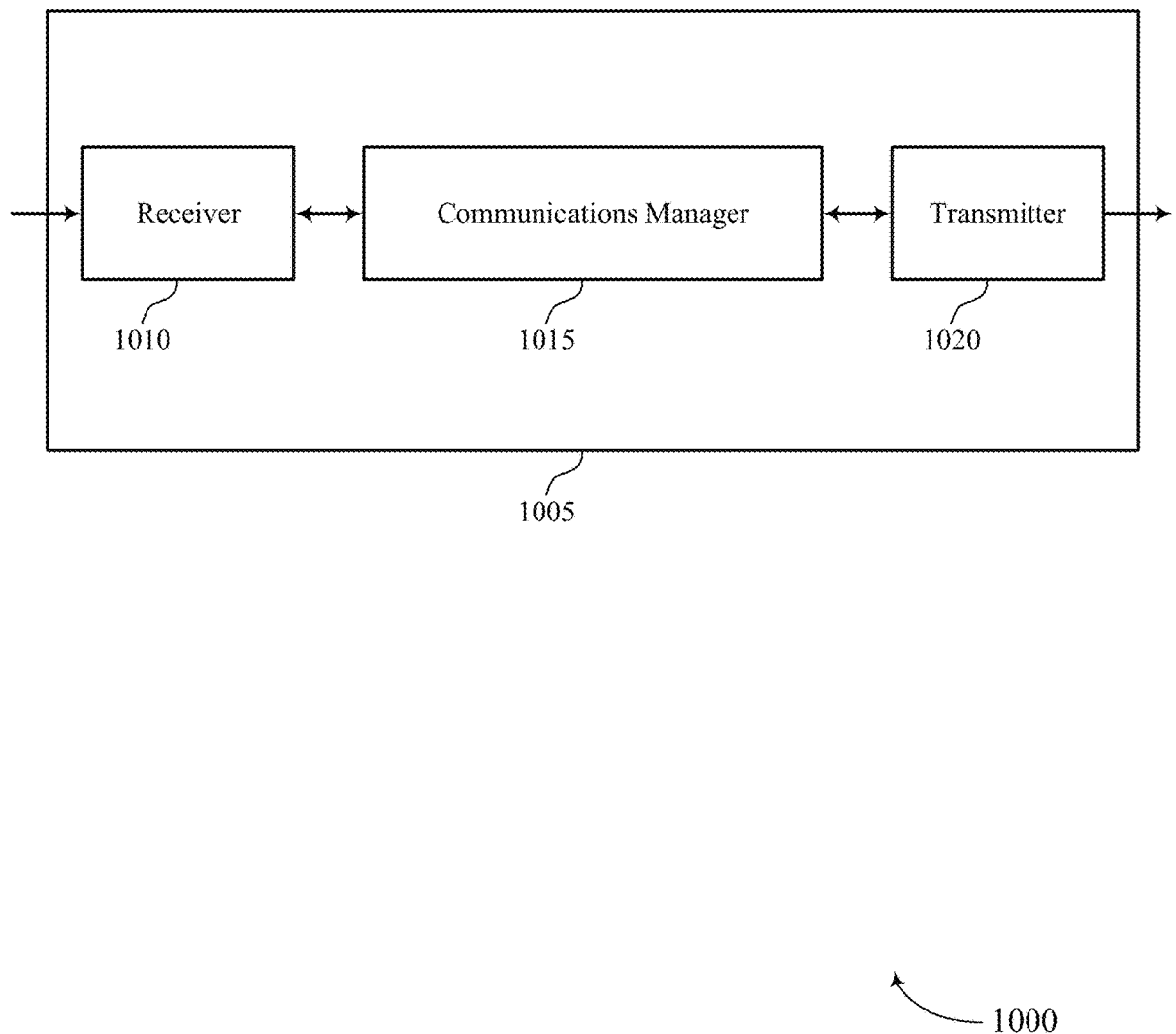
FIGS. 10 and 11 show block diagrams of devices that support techniques to order direction signals during discontinuous reception in accordance with aspects of the present disclosure.

FIG. 10 shows a block diagram 1000 of a device 1005 that supports techniques to order direction signals during discontinuous reception in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques to order direction signals during discontinuous reception, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a set of reference signals using a first ordered set of beams, transmit the set of reference signals using the second ordered set of beams, receive feedback information from a UE operating in a DRX mode, the feedback information based on the set of reference signals, and generate a second ordered set of beams for the set of reference signals that is different from the first ordered set of beams, the second ordered set of beams based on receiving the feedback information from the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
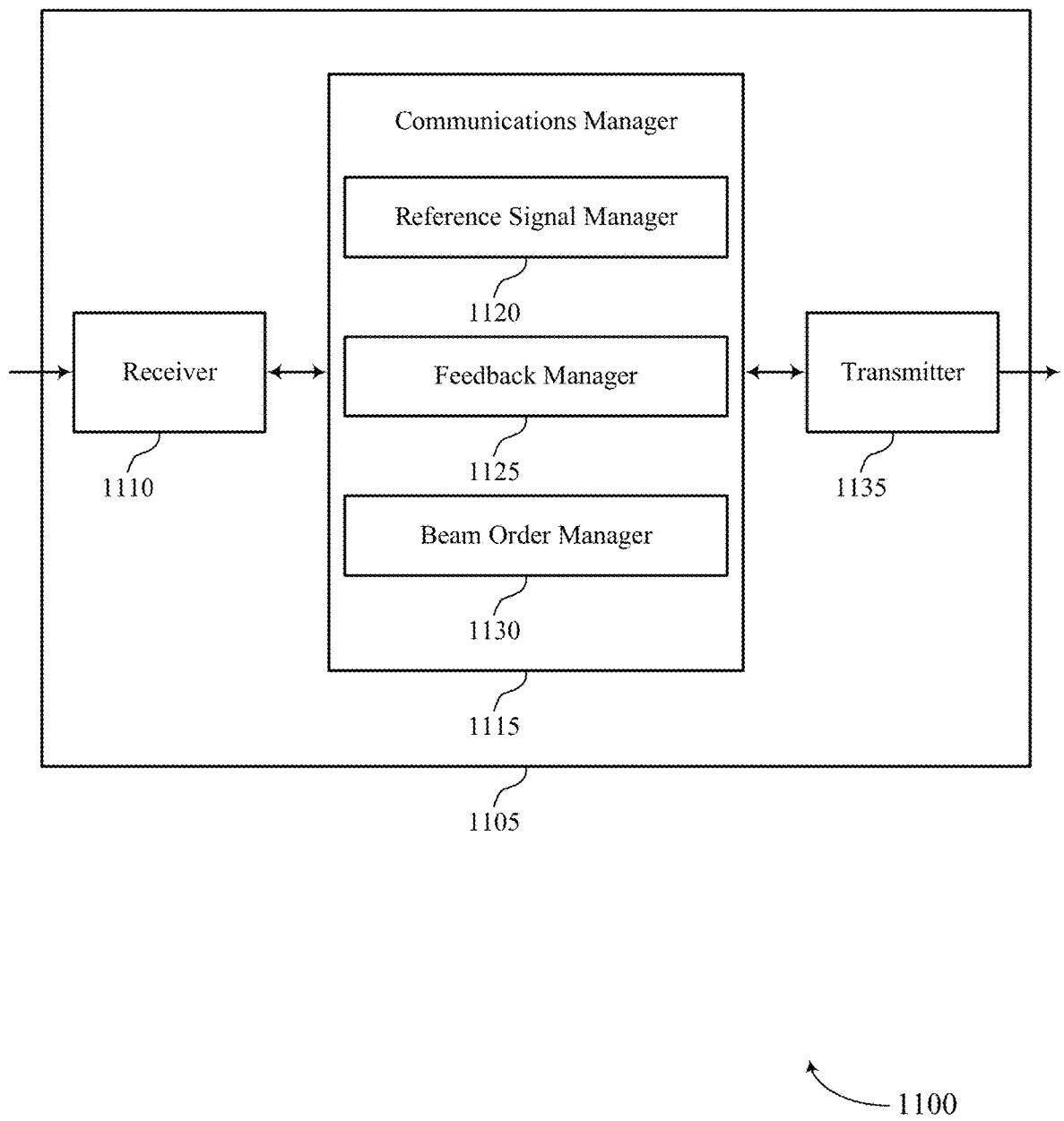

FIG. 11 shows a block diagram 1100 of a device 1105 that supports techniques to order direction signals during discontinuous reception in accordance with aspects of the present disclosure. The device 1105 may be an example of aspects of a device 1005 or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques to order direction signals during discontinuous reception, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reference signal manager 1120, a feedback manager 1125, and a beam order manager 1130. The communications manager 1115 may be an example of aspects of the communications manager 1310 described herein.

The reference signal manager 1120 may transmit a set of reference signals using a first ordered set of beams and transmit the set of reference signals using the second ordered set of beams.

The feedback manager 1125 may receive feedback information from a UE operating in a DRX mode, the feedback information based on the set of reference signals.

The beam order manager 1130 may generate a second ordered set of beams for the set of reference signals that is different from the first ordered set of beams, the second ordered set of beams based on receiving the feedback information from the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
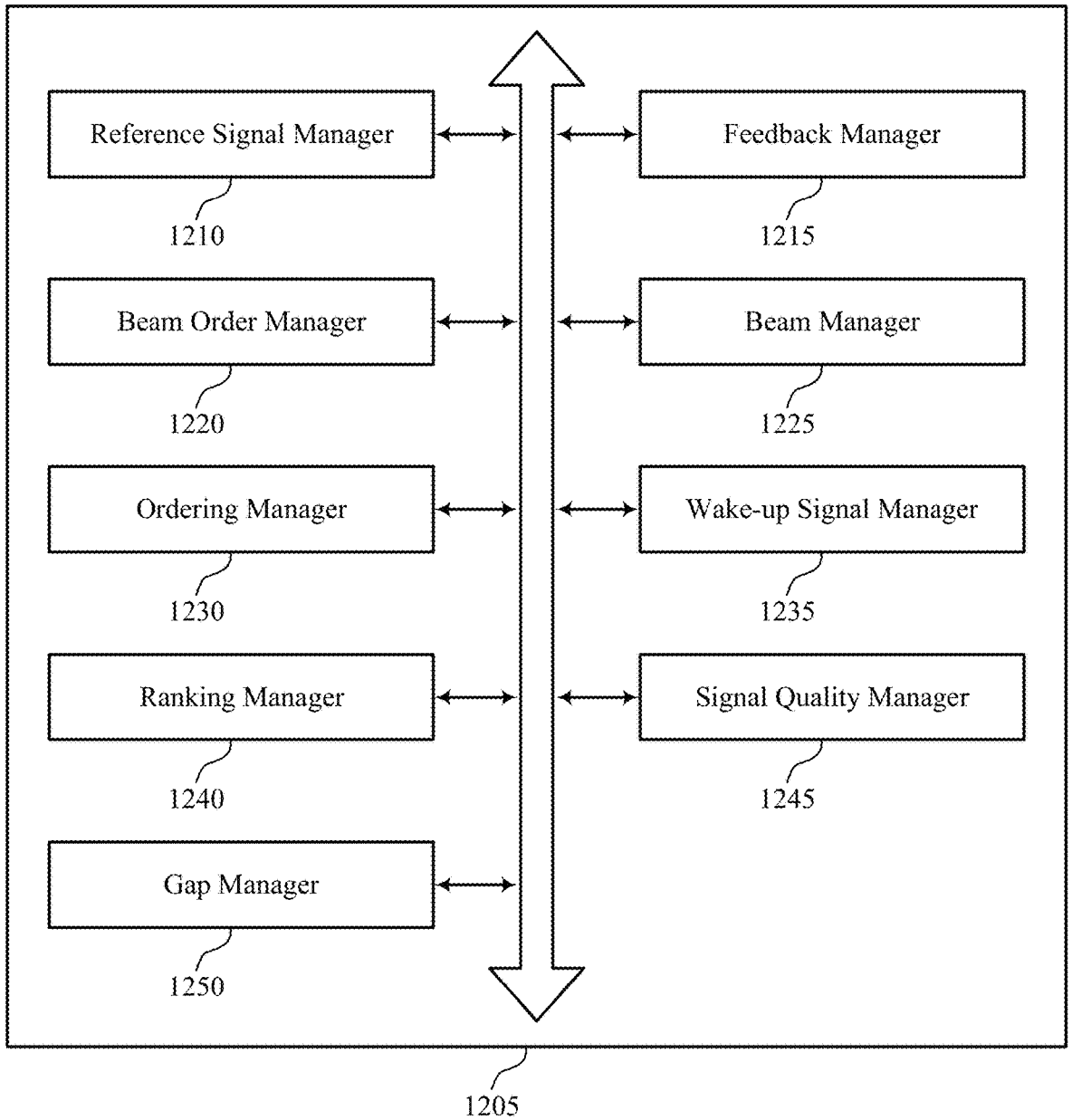
FIG. 12 shows a block diagram of a communications manager that supports techniques to order direction signals during discontinuous reception in accordance with aspects of the present disclosure.

FIG. 12 shows a block diagram 1200 of a communications manager 1205 that supports techniques to order direction signals during discontinuous reception in accordance with aspects of the present disclosure. The communications manager 1205 may be an example of aspects of a communications manager 1015, a communications manager 1115, or a communications manager 1310 described herein. The communications manager 1205 may include a reference signal manager 1210, a feedback manager 1215, a beam order manager 1220, a beam manager 1225, an ordering manager 1230, a wake-up signal manager 1235, a ranking manager 1240, a signal quality manager 1245, and a gap manager 1250. Each of these modules may communicate, directly or indirectly, with one another (e.g., via one or more buses).

The reference signal manager 1210 may transmit a set of reference signals using a first ordered set of beams. In some examples, the reference signal manager 1210 may transmit the set of reference signals using the second ordered set of beams. In some cases, the set of reference signals includes channel state information reference signals CSI-RSs, DMRSs, PSSs, SSSs, PBCH signals, or a combination thereof. In some cases, the set of reference signals are transmitted during an off-period of the DRX mode of the UE. In some cases, the UE is in a C-DRX mode.

The feedback manager 1215 may receive feedback information from a UE operating in a DRX mode, the feedback information based on the set of reference signals. In some cases, the feedback information includes RSRP, RSRQ, SNR, SNIR, or a combination thereof. In some cases, the feedback information includes information about the angle of departure, information about reception array of the UE used to receive a signal transmitted using a beam of the first ordered set of beams, or a combination thereof. In some cases, the feedback information is received during an on-period of a DRX cycle or during an off-period of the DRX cycle.

The beam order manager 1220 may generate a second ordered set of beams for the set of reference signals that is different from the first ordered set of beams, the second ordered set of beams based on receiving the feedback information from the UE.

The beam manager 1225 may identify a first beam of the first ordered set of beams to be used to communicate a wake-up signal to the UE based on the feedback information. In some examples, the beam manager 1225 may identify a second beam of the first ordered set of beams to be used to communicate the wake-up signal based on the feedback information.

In some examples, the beam manager 1225 may identify a beam index of a beam of the first ordered set of beams selected by the UE to be used to communicate a wake-up signal based on the feedback information, where generating the second ordered set of beams is based on identifying the beam index selected by the UE. In some examples, the beam manager 1225 may identify an angle of departure for the beams of the first ordered set of beams based on the feedback information, where generating the second ordered set of beams is based on identifying the angle of departure for the beams.

The ordering manager 1230 may reorder the first ordered set of beams to prioritize the first beam based on identifying the first beam, where generating the second ordered set of beams is based on reordering the first ordered set of beams. In some examples, the ordering manager 1230 may reorder the first ordered set of beams to prioritize the first beam and the second beam based on identifying the first beam, where generating the second ordered set of beams is based on reordering the first ordered set of beams.

In some examples, the ordering manager 1230 may identify that the feedback information fails to indicate a preference between at least some beams included in the feedback information. In some examples, the ordering manager 1230 may order the beams for the second ordered set of beams based on which beams are adjacent to each other. In some cases, the first beam is positioned before the second beam in the second ordered set of beams. In some cases, the first beam is adjacent to the second beam in the second ordered set of beams.

The wake-up signal manager 1235 may transmit the wake-up signal using the first beam and the second beam during an on-period of the DRX mode of the UE.

The ranking manager 1240 may rank the beams of the first ordered set of beams based on a signal quality for each signal associated with the beams based on the feedback information, where generating the second ordered set of beams is based on ranking the beams.

The signal quality manager 1245 may identify an indication of signal quality based on receiving the feedback information, where generating the second ordered set of beams is based on identifying the indication of signal quality. In some cases, a number of reference signals of the subset of reference signals is less than a number of reference signals of the set of reference signals.

The gap manager 1250 may identify a gap time between transmissions of the set of reference signals based on the feedback information indicating that the UE will change reception arrays to receive two adjacent signals of the set of reference signals, where transmitting the set of reference signals using the second ordered set of beams is based on identifying the gap time.

Figure 13:
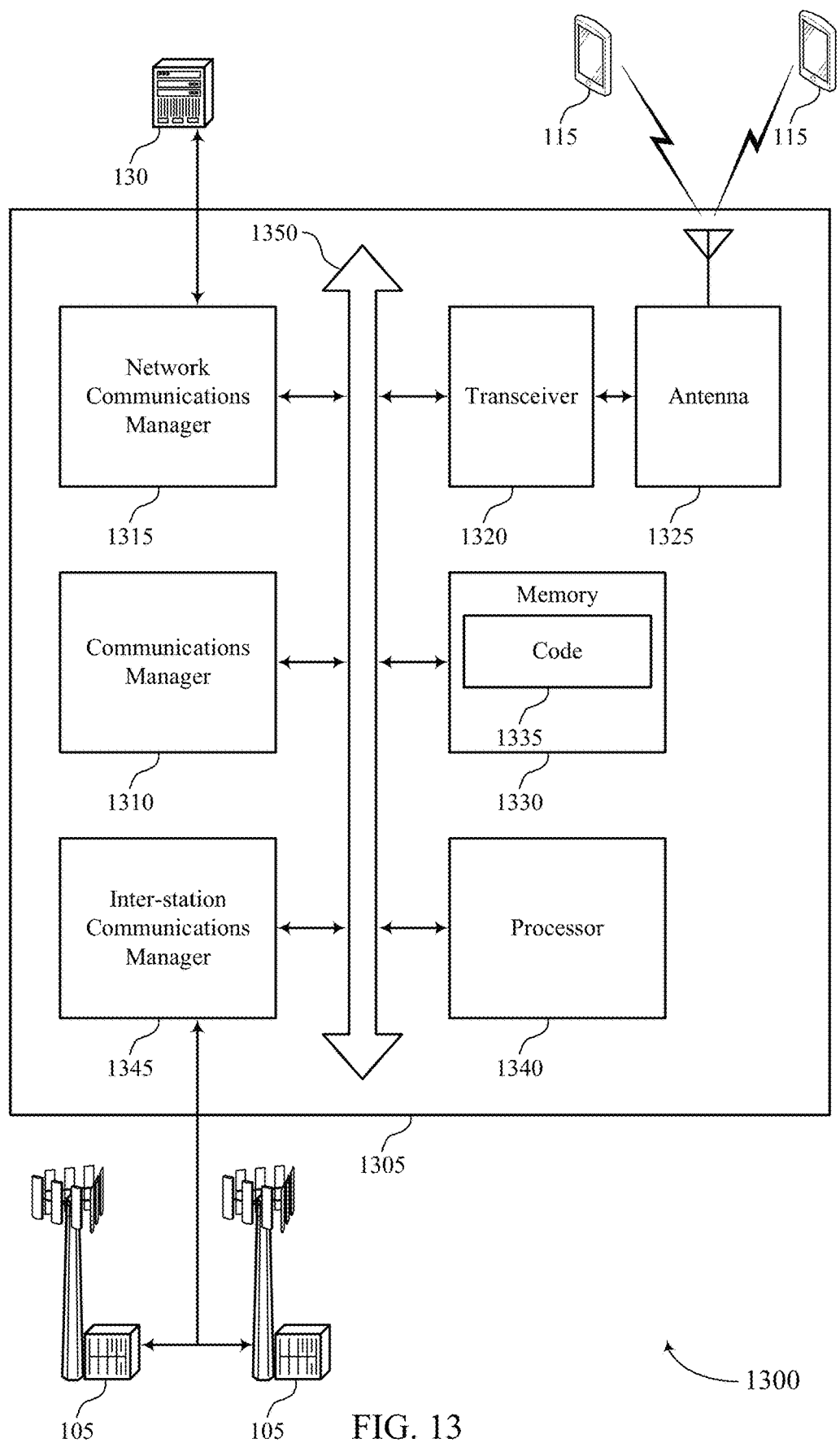
FIG. 13 shows a diagram of a system including a device that supports techniques to order direction signals during discontinuous reception in accordance with aspects of the present disclosure.

FIG. 13 shows a diagram of a system 1300 including a device 1305 that supports techniques to order direction signals during discontinuous reception in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a set of reference signals using a first ordered set of beams, transmit the set of reference signals using the second ordered set of beams, receive feedback information from a UE operating in a DRX mode, the feedback information based on the set of reference signals, and generate a second ordered set of beams for the set of reference signals that is different from the first ordered set of beams, the second ordered set of beams based on receiving the feedback information from the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting techniques to order direction signals during discontinuous reception).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
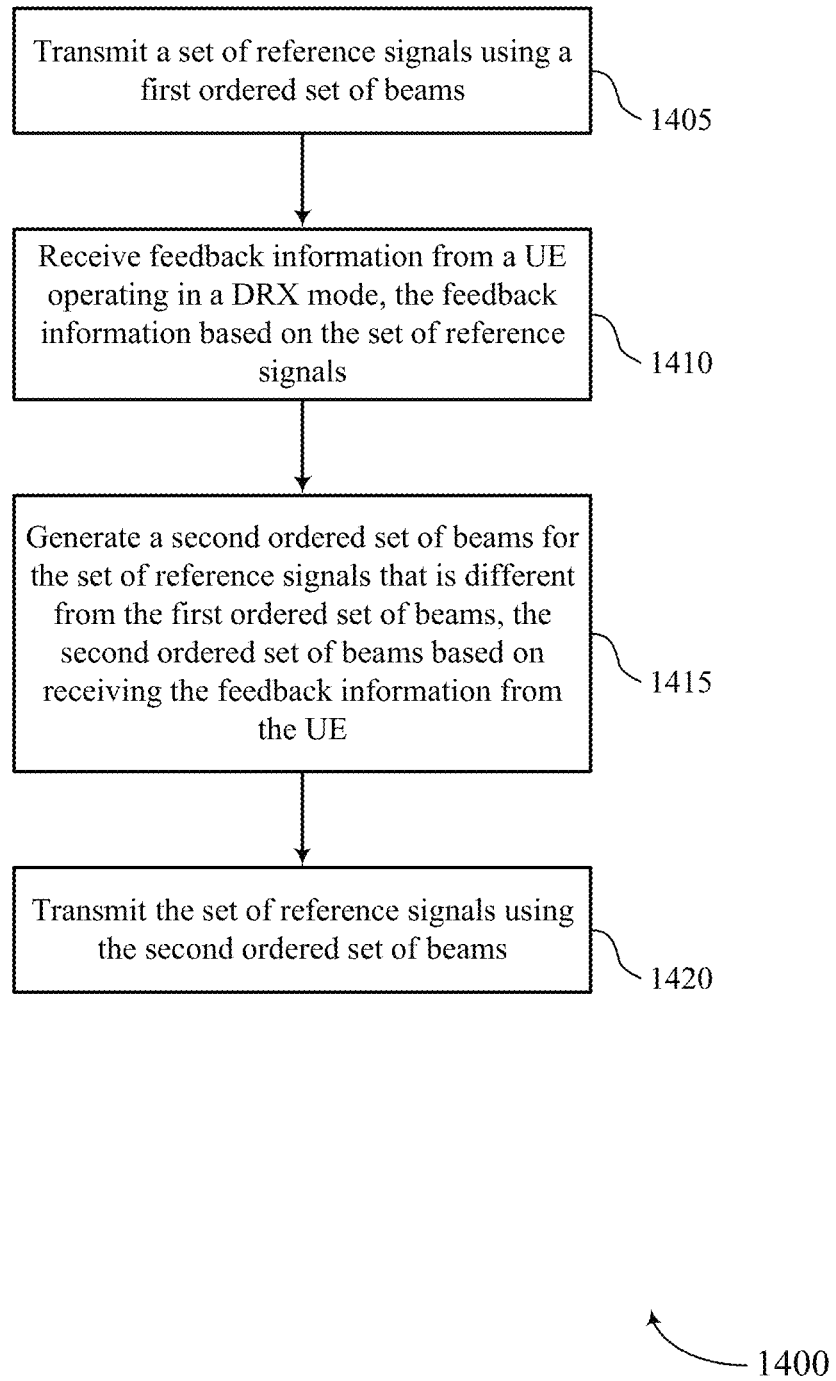
FIGS. 14 through 17 show flowcharts illustrating methods that support techniques to order direction signals during discontinuous reception in accordance with aspects of the present disclosure.

FIG. 14 shows a flowchart illustrating a method 1400 that supports techniques to order direction signals during discontinuous reception in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may transmit a set of reference signals using a first ordered set of beams. The operations of 1405 may be performed according to the methods described herein. In some examples, aspects of the operations of 1405 may be performed by a reference signal manager as described with reference to FIGS. 10 through 13.

At 1410, the base station may receive feedback information from a UE operating in a DRX mode, the feedback information based on the set of reference signals. The operations of 1410 may be performed according to the methods described herein. In some examples, aspects of the operations of 1410 may be performed by a feedback manager as described with reference to FIGS. 10 through 13.

At 1415, the base station may generate a second ordered set of beams for the set of reference signals that is different from the first ordered set of beams, the second ordered set of beams based on receiving the feedback information from the UE. The operations of 1415 may be performed according to the methods described herein. In some examples, aspects of the operations of 1415 may be performed by a beam order manager as described with reference to FIGS. 10 through 13.

At 1420, the base station may transmit the set of reference signals using the second ordered set of beams. The operations of 1420 may be performed according to the methods described herein. In some examples, aspects of the operations of 1420 may be performed by a reference signal manager as described with reference to FIGS. 10 through 13.

Figure 15:
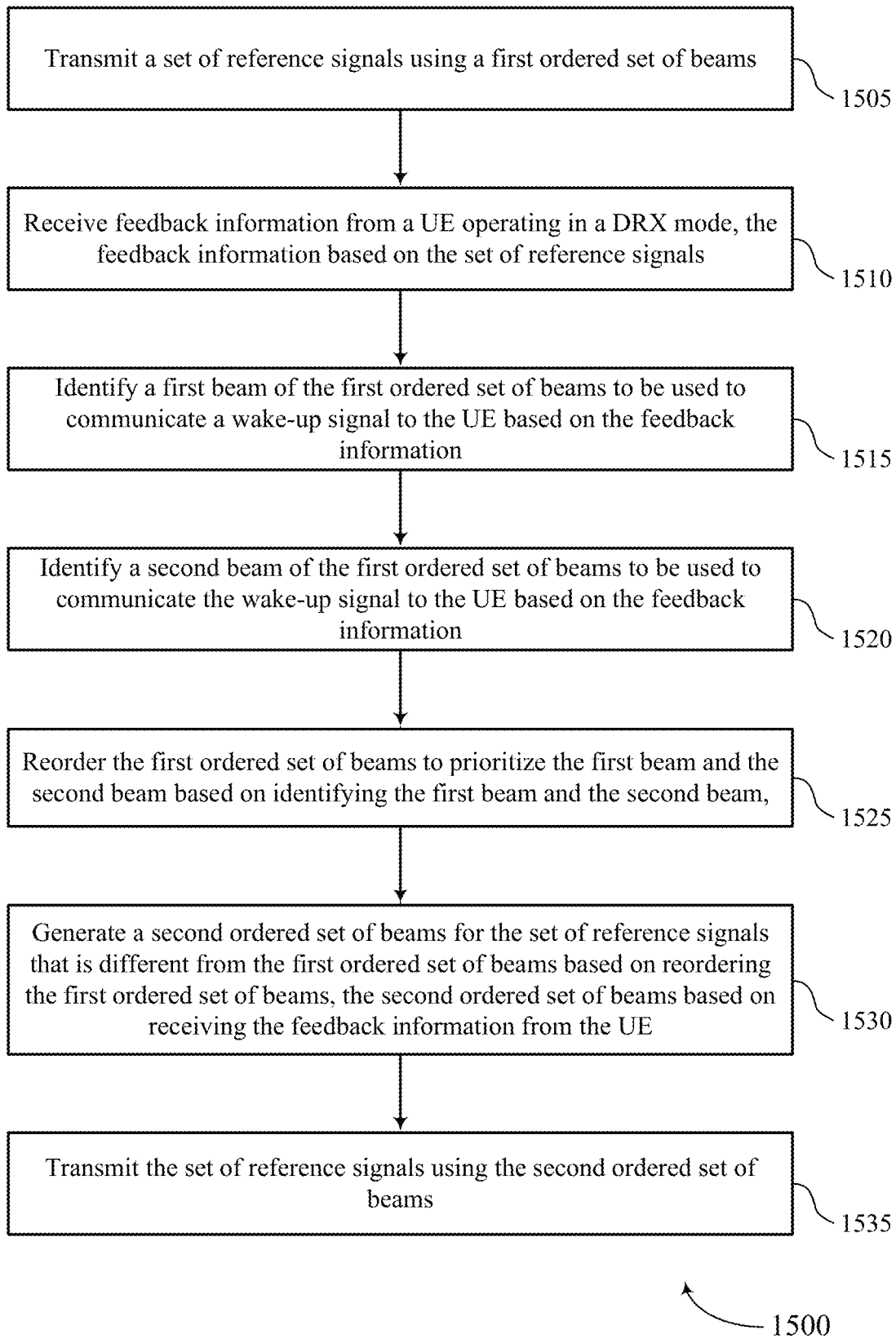

FIG. 15 shows a flowchart illustrating a method 1500 that supports techniques to order direction signals during discontinuous reception in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit a set of reference signals using a first ordered set of beams. The operations of 1505 may be performed according to the methods described herein. In some examples, aspects of the operations of 1505 may be performed by a reference signal manager as described with reference to FIGS. 10 through 13.

At 1510, the base station may receive feedback information from a UE operating in a DRX mode, the feedback information based on the set of reference signals. The operations of 1510 may be performed according to the methods described herein. In some examples, aspects of the operations of 1510 may be performed by a feedback manager as described with reference to FIGS. 10 through 13.

At 1515, the base station may identify a first beam of the first ordered set of beams to be used to communicate a wake-up signal to the UE based on the feedback information. The operations of 1515 may be performed according to the methods described herein. In some examples, aspects of the operations of 1515 may be performed by a beam manager as described with reference to FIGS. 10 through 13.

At 1520, the base station may identify a second beam of the first ordered set of beams to be used to communicate the wake-up signal to the UE based on the feedback information. The operations of 1520 may be performed according to the methods described herein. In some examples, aspects of the operations of 1520 may be performed by a beam manager as described with reference to FIGS. 10 through 13.

At 1525, the base station may reorder the first ordered set of beams to prioritize the first beam and the second beam based on identifying the first beam and the second beam, where generating the second ordered set of beams is based on reordering the first ordered set of beams. The operations of 1525 may be performed according to the methods described herein. In some examples, aspects of the operations of 1525 may be performed by an ordering manager as described with reference to FIGS. 10 through 13.

At 1530, the base station may generate a second ordered set of beams for the set of reference signals that is different from the first ordered set of beams based on reordering the first ordered set of beams, the second ordered set of beams based on receiving the feedback information from the UE. The operations of 1530 may be performed according to the methods described herein. In some examples, aspects of the operations of 1530 may be performed by a beam order manager as described with reference to FIGS. 10 through 13.

At 1535, the base station may transmit the set of reference signals using the second ordered set of beams. The operations of 1535 may be performed according to the methods described herein. In some examples, aspects of the operations of 1535 may be performed by a reference signal manager as described with reference to FIGS. 10 through 13.

Figure 16:
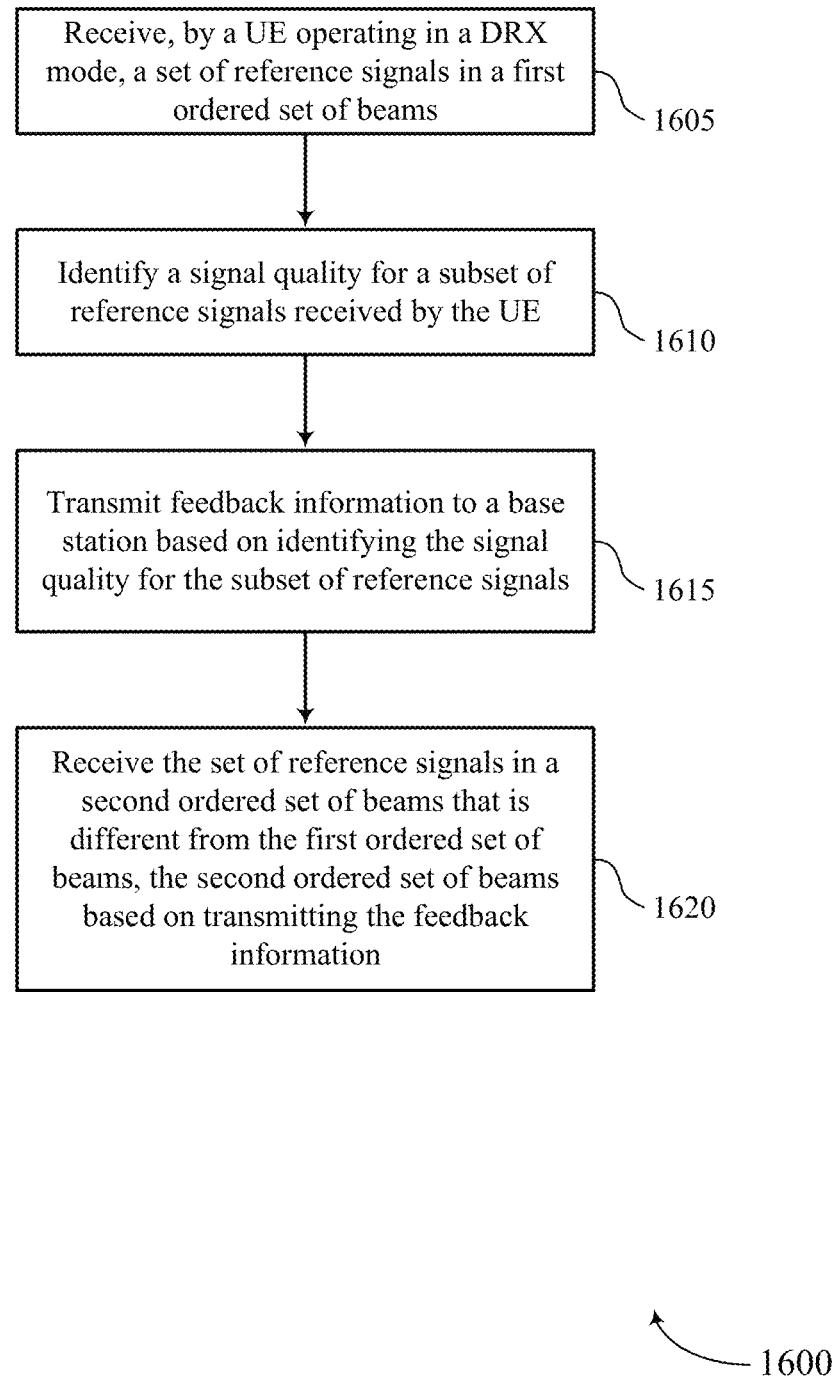

FIG. 16 shows a flowchart illustrating a method 1600 that supports techniques to order direction signals during discontinuous reception in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, by a UE operating in a DRX mode, a set of reference signals in a first ordered set of beams. The operations of 1605 may be performed according to the methods described herein. In some examples, aspects of the operations of 1605 may be performed by a reference signal manager as described with reference to FIGS. 6 through 9.

At 1610, the UE may identify a signal quality for a subset of reference signals received by the UE. The operations of 1610 may be performed according to the methods described herein. In some examples, aspects of the operations of 1610 may be performed by a signal quality manager as described with reference to FIGS. 6 through 9.

At 1615, the UE may transmit feedback information to a base station based on identifying the signal quality for the subset of reference signals. The operations of 1615 may be performed according to the methods described herein. In some examples, aspects of the operations of 1615 may be performed by a feedback manager as described with reference to FIGS. 6 through 9.

At 1620, the UE may receive the set of reference signals in a second ordered set of beams that is different from the first ordered set of beams, the second ordered set of beams based on transmitting the feedback information. The operations of 1620 may be performed according to the methods described herein. In some examples, aspects of the operations of 1620 may be performed by a reference signal manager as described with reference to FIGS. 6 through 9.

Figure 17:
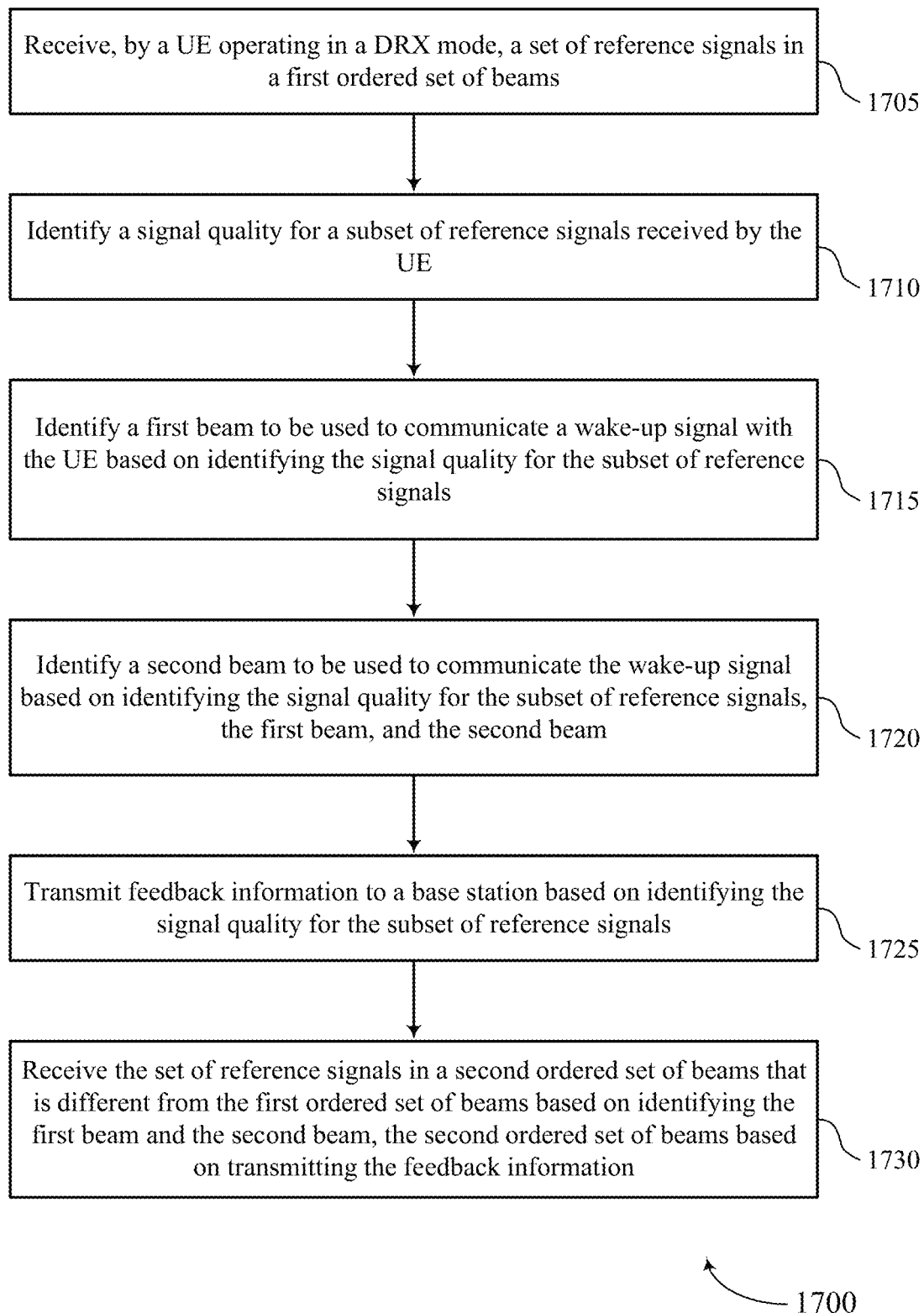

FIG. 17 shows a flowchart illustrating a method 1700 that supports techniques to order direction signals during discontinuous reception in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, by a UE operating in a DRX mode, a set of reference signals in a first ordered set of beams. The operations of 1705 may be performed according to the methods described herein. In some examples, aspects of the operations of 1705 may be performed by a reference signal manager as described with reference to FIGS. 6 through 9.

At 1710, the UE may identify a signal quality for a subset of reference signals received by the UE. The operations of 1710 may be performed according to the methods described herein. In some examples, aspects of the operations of 1710 may be performed by a signal quality manager as described with reference to FIGS. 6 through 9.

At 1715, the UE may identify a first beam to be used to communicate a wake-up signal with the UE based on identifying the signal quality for the subset of reference signals. The operations of 1715 may be performed according to the methods described herein. In some examples, aspects of the operations of 1715 may be performed by a beam manager as described with reference to FIGS. 6 through 9.

At 1720, the UE may identify a second beam to be used to communicate the wake-up signal based on identifying the signal quality for the subset of reference signals. The operations of 1720 may be performed according to the methods described herein. In some examples, aspects of the operations of 1720 may be performed by a beam manager as described with reference to FIGS. 6 through 9.

At 1725, the UE may transmit feedback information to a base station based on identifying the signal quality for the subset of reference signals, the first beam, and the second beam. The operations of 1725 may be performed according to the methods described herein. In some examples, aspects of the operations of 1725 may be performed by a feedback manager as described with reference to FIGS. 6 through 9.

At 1730, the UE may receive the set of reference signals in a second ordered set of beams that is different from the first ordered set of beams based on identifying the first beam and the second beam, the second ordered set of beams based on transmitting the feedback information. The operations of 1730 may be performed according to the methods described herein. In some examples, aspects of the operations of 1730 may be performed by a reference signal manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-orthogonal frequency division multiplexing (Flash-OFDM), etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include Pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA, or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be clear to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a user equipment (UE) operating in a discontinuous reception (DRX) mode, a set of reference signals in a first ordered set of beams, the first ordered set of beams comprising at least a first beam and a second beam received in a first order of a beam sweep;
   identifying a signal quality for a subset of reference signals received by the UE;
   transmitting feedback information to a base station based at least in part on identifying the signal quality for the subset of reference signals; and
   receiving the set of reference signals in a second ordered set of beams that is different from the first ordered set of beams, the second ordered set of beams based at least in part on transmitting the feedback information, the second ordered set of beams comprising at least the first beam and the second beam received in a different order of a later beam sweep.

2. The method of claim 1, further comprising:
   identifying the first beam to be used to communicate a wake-up signal with the UE based at least in part on identifying the signal quality for the subset of reference signals, wherein receiving the set of reference signals in the second ordered set of beams is based at least in part on identifying the first beam.

3. The method of claim 2, further comprising:
   identifying the second beam to be used to communicate the wake-up signal based at least in part on identifying the signal quality for the subset of reference signals, wherein receiving the set of reference signals in the second ordered set of beams is based at least in part on identifying the second beam.

4. The method of claim 3, wherein the first beam is received before the second beam in the different order of the second ordered set of beams; and wherein the first beam is adjacent to the second beam in the second ordered set of beams.

5. The method of claim 3, further comprising:
receiving the wake-up signal using the first beam or the second beam during an on-period of the DRX mode of the UE based at least in part on transmitting the feedback information.

6. The method of claim 1, further comprising:
ranking the beams of the first ordered set of beams based at least in part on identifying the signal quality for the subset of reference signals, wherein the feedback information is based at least in part on ranking the beams.

7. The method of claim 1, wherein identifying the signal quality for each signal further comprises:
identifying a received signal received power (RSRP), a received signal received quality (RSRQ), a signal-to-noise ratio (SNR), a signal-to-interference-plus-noise ratio (SNIR), or a combination thereof for the subset of reference signals.

8. The method of claim 1, further comprising:
selecting a beam index of a beam of the first ordered set of beams to be used to communicate a wake-up signal, wherein the feedback information is based at least in part on selecting the beam index.

9. The method of claim 1, further comprising:
identifying an angle of departure of the subset of reference signals or a reception array used to receive the subset of reference signals, wherein the feedback information includes information related to the angle of departure or the reception array of the subset of reference signals, wherein receiving the set of reference signals in the second ordered set of beams is based at least in part on identifying the angle of departure or the reception array used to receive the subset of reference signals.

10. The method of claim 1, wherein the set of reference signals comprises channel state information reference signals (CSI-RSs), demodulation reference signals (DMRSs), primary synchronization signals (PSSs), or secondary synchronization signals (SSSs), or a combination thereof.

11. The method of claim 1, wherein the UE is in a connected discontinuous reception (C-DRX) mode, and wherein the set of reference signals are received during an off-period of the DRX mode of the UE.

12. The method of claim 1, wherein the UE transmits the feedback information during an on-period of a DRX cycle or during an off-period of the DRX cycle.

13. The method of claim 1, wherein a number of reference signals of the subset of reference signals is less than a number of reference signals of the set of reference signals.

14. A method for wireless communication, comprising:
receiving, by a user equipment (UE) operating in a discontinuous reception (DRX) mode, a set of reference signals in a first ordered set of beams;
identifying a signal quality for a subset of reference signals received by the UE;
transmitting feedback information to a base station based at least in part on identifying the signal quality for the subset of reference signals;
receiving the set of reference signals in a second ordered set of beams that is different from the first ordered set of beams, the second ordered set of beams based at least in part on transmitting the feedback information; and further comprising:
configuring a reception array during a gap time between transmissions of the set of reference signals, wherein receiving the set of reference signals in the second ordered set of beams is based at least in part on configuring the reception array during the gap time.

15. The method of claim 14, wherein the UE configures the reception array during the gap time in response to determining to decode a reference signal of a second beam of the second ordered set of beams subsequent to decoding a reference signal of a first beam of the second ordered set of beams.

16. A method for wireless communication, comprising:
transmitting a set of reference signals using a first ordered set of beams, the first ordered set of beams comprising at least a first beam and a second beam transmitted in a first order of a beam sweep;
receiving feedback information from a user equipment (UE) operating in a discontinuous reception (DRX) mode, the feedback information based at least in part on the set of reference signals;
generating a second ordered set of beams for the set of reference signals that is different from the first ordered set of beams, the second ordered set of beams based at least in part on receiving the feedback information from the UE; and
transmitting the set of reference signals using the second ordered set of beams in a later beam sweep, wherein transmitting the set of reference signals using the second ordered set of beams comprises transmitting at least the first beam and the second beam in a different order in the later beam sweep.

17. The method of claim 16, further comprising:
identifying the first beam of the first ordered set of beams to be used to communicate a wake-up signal to the UE based at least in part on the feedback information.

18. The method of claim 17, further comprising:
reordering the first ordered set of beams to prioritize the first beam based at least in part on identifying the first beam, wherein generating the second ordered set of beams is based at least in part on reordering the first ordered set of beams.

19. The method of claim 17, further comprising:
identifying the second beam of the first ordered set of beams to be used to communicate the wake-up signal based at least in part on the feedback information; and
reordering the first ordered set of beams to prioritize the first beam and the second beam based at least in part on identifying the first beam, wherein generating the second ordered set of beams is based at least in part on reordering the first ordered set of beams.

20. The method of claim 19, wherein the first beam is transmitted before the second beam in the second ordered set of beams; and wherein the first beam is adjacent to the second beam in the second ordered set of beams.

21. The method of claim 19, further comprising:
transmitting the wake-up signal using the first beam and the second beam during an on-period of the DRX mode of the UE.

22. The method of claim 16, further comprising:
ranking the beams of the first ordered set of beams based at least in part on a signal quality for each signal associated with the beams based at least in part on the feedback information, wherein generating the second ordered set of beams is based at least in part on ranking the beams.

23. The method of claim 16, further comprising:
identifying an indication of signal quality based at least in part on receiving the feedback information, wherein generating the second ordered set of beams is based at least in part on identifying the indication of signal quality, wherein the feedback information includes received signal received power (RSRP), received signal received quality (RSRQ), a signal-to-noise ratio (SNR), a signal-to-interference-plus-noise ratio (SNIR), or a combination thereof.

24. The method of claim 16, further comprising:
identifying a beam index of a beam of the first ordered set of beams selected by the UE to be used to communicate a wake-up signal based at least in part on the feedback information, wherein generating the second ordered set of beams is based at least in part on identifying the beam index selected by the UE.

25. The method of claim 16, wherein the set of reference signals comprises channel state information reference signals (CSI-RSs), demodulation reference signals (DMRSs), primary synchronization signals (PSSs), secondary synchronization signals (SSSs), or physical broadcast channel (PBCH) signals, or a combination thereof.

26. A method for wireless communication, comprising:
transmitting a set of reference signals using a first ordered set of beams;
receiving feedback information from a user equipment (UE) operating in a discontinuous reception (DRX) mode, the feedback information based at least in part on the set of reference signals;
generating a second ordered set of beams for the set of reference signals that is different from the first ordered set of beams, the second ordered set of beams based at least in part on receiving the feedback information from the UE;
transmitting the set of reference signals using the second ordered set of beams; and
identifying a gap time between transmissions of the set of reference signals based at least in part on the feedback information indicating that the UE will change reception arrays to receive two adjacent signals of the set of reference signals, wherein transmitting the set of reference signals using the second ordered set of beams is based at least in part on identifying the gap time.

27. The method of claim 16, wherein the UE is in a connected discontinuous reception (C-DRX) mode.

28. The method of claim 16, wherein the feedback information is received during an on-period of a DRX cycle or during an off-period of the DRX cycle.

29. An apparatus for wireless communication, comprising:
a processor,
memory in electronic communication with the processor; and
instructions stored in the memory and executable by the processor to cause the apparatus to:
receive, by a user equipment (UE) operating in a discontinuous reception (DRX) mode, a set of reference signals in a first ordered set of beams, the first ordered set of beams comprising at least a first beam and a second beam to receive in a first order of a beam sweep;
identify a signal quality for a subset of reference signals received by the UE;
transmit feedback information to a base station based at least in part on identifying the signal quality for the subset of reference signals; and
receive the set of reference signals in a second ordered set of beams that is different from the first ordered set of beams, the second ordered set of beams based at least in part on transmitting the feedback information, the second ordered set of beams comprising at least the first beam and the second beam to receive in a different order of a later beam sweep.

30. An apparatus for wireless communication, comprising:
a processor,
memory in electronic communication with the processor; and
instructions stored in the memory and executable by the processor to cause the apparatus to:
transmit a set of reference signals in a beam sweep using a first ordered set of beams, the first ordered set of beams comprising at least a first beam and a second beam to transmit in a first order;
receive feedback information from a user equipment (UE) operating in a discontinuous reception (DRX) mode, the feedback information based at least in part on the set of reference signals;
generate a second ordered set of beams for the set of reference signals that is different from the first ordered set of beams, the second ordered set of beams based at least in part on receiving the feedback information from the UE; and
transmit the set of reference signals using the second ordered set of beams in a later beam sweep, the second ordered set of beams including the first beam and the second beam to transmit in a different order in the later beam sweep.

* * * * *